United States Patent [19]
Asghar et al.

[11] Patent Number: 5,452,242
[45] Date of Patent: * Sep. 19, 1995

[54] METHOD AND APPARATUS FOR MULTIPLYING A PLURALITY OF NUMBERS

[75] Inventors: Safdar M. Asghar, Austin, Tex.; Donald D. Mondul, Milwaukee, Wis.

[73] Assignee: Advanced Micro Devices, Inc., Austin, Tex.

[*] Notice: The portion of the term of this patent subsequent to Aug. 4, 2009 has been disclaimed.

[21] Appl. No.: 204,004

[22] Filed: Mar. 1, 1994

Related U.S. Application Data

[63] Continuation-in-part of Ser. No. 42,825, Apr. 5, 1993, Pat. No. 5,291,430, which is a continuation-in-part of Ser. No. 924,346, Aug. 13, 1992, Pat. No. 5,200,912, which is a continuation-in-part of Ser. No. 794,995, Nov. 19, 1991, Pat. No. 5,136,537.

[51] Int. Cl.⁶ ............................................. G06F 7/52
[52] U.S. Cl. .................................................. 364/754
[58] Field of Search ............................... 364/754, 757

[56] References Cited

U.S. PATENT DOCUMENTS

| | | | |
|---|---|---|---|
| 4,573,136 | 2/1986 | Rossiter | 364/757 X |
| 4,809,212 | 2/1989 | New et al. | 364/754 X |

*Primary Examiner*—Tan V. Mai
*Attorney, Agent, or Firm*—Foley & Lardner

[57] ABSTRACT

A method and apparatus for determining the product of a plurality of N numbers are disclosed. The preferred embodiment of the method includes the steps of: (1) determining a plurality of partial products made up of respective partial products for each combination of the digits of each of the N numbers, each partial product having a combinational significance established by the significance of each digit involved in the respective partial product; (2) providing a register having a plurality of register cells, each having a hierarchical significance; (3) accumulating selected of the partial products to produce accumulated values in specified of the register cells according to the following relationships: $P[m,n,o,p, \ldots] \rightarrow [\text{accumulates in}] \rightarrow r[x]$; $x = (m+n+o+p+ \ldots) - (N-1)$, where $P[m,n,o,p, \ldots]$ represents the partial product; "m" represents the first digit's significance ($m = 1, 2, \ldots$); "n" represents the second digit's significance ($n = 1, 2, \ldots$); "o", "p", and "..." represent subsequent digits' significances; and "r[x]" represents a specified register cell having significance "x"; (4) effecting a shifting accumulation operation comprising shifting specific digits of the accumulated value stored in a lesser-significant register cell to the next-higher-significant register cell containing an accumulated value, and adding the specific digits to the accumulated value stored in the next-higher-significant register cell as least-significant digits between significance-adjacent register cells from the least-significant register cell to the most-significant register cell; (5) shifting the contents of the register from the register.

7 Claims, 11 Drawing Sheets

FIG. 2

| Σm+n | $r_x$ | \ | COL., ROW (m,n) | | | | | | | | | | | | |
|---|---|---|---|---|---|---|---|---|---|---|---|---|---|---|---|
| | | n=1 | n=2 | n=3 | n=4 | n=5 | n=6 | n=7 | n=8 | n=9 | n=10 | n=11 | n=12 | n=13 | n=14 |
| 2 | $r_1$ | 1,1 | | | | | | | | | | | | | |
| 3 | $r_2$ | 2,1 | 1,2 | | | | | | | | | | | | |
| 4 | $r_3$ | 3,1 | 2,2 | 1,3 | | | | | | | | | | | |
| 5 | $r_4$ | 4,1 | 3,2 | 2,3 | 1,4 | | | | | | | | | | |
| 6 | $r_5$ | 5,1 | 4,2 | 3,3 | 2,4 | 1,5 | | | | | | | | | |
| 7 | $r_6$ | 6,1 | 5,2 | 4,3 | 3,4 | 2,5 | 1,6 | | | | | | | | |
| 8 | $r_7$ | 7,1 | 6,2 | 5,3 | 4,4 | 3,5 | 2,6 | 1,7 | | | | | | | |
| 9 | $r_8$ | 8,1 | 7,2 | 6,3 | 5,4 | 4,5 | 3,6 | 2,7 | 1,8 | | | | | | |
| 10 | $r_9$ | 9,1 | 8,2 | 7,3 | 6,4 | 5,5 | 4,6 | 3,7 | 2,8 | 1,9 | | | | | |
| 11 | $r_{10}$ | 10,1 | 9,2 | 8,3 | 7,4 | 6,5 | 5,6 | 4,7 | 3,8 | 2,9 | 1,10 | | | | |
| 12 | $r_{11}$ | 11,1 | 10,2 | 9,3 | 8,4 | 7,5 | 6,6 | 5,7 | 4,8 | 3,9 | 2,10 | 1,11 | | | |
| 13 | $r_{12}$ | 12,1 | 11,2 | 10,3 | 9,4 | 8,5 | 7,6 | 6,7 | 5,8 | 4,9 | 3,10 | 2,11 | 1,12 | | |
| 14 | $r_{13}$ | 13,1 | 12,2 | 11,3 | 10,4 | 9,5 | 8,6 | 7,7 | 6,8 | 5,9 | 4,10 | 3,11 | 2,12 | 1,13 | |
| 15 | $r_{14}$ | 14,1 | 13,2 | 12,3 | 11,4 | 10,5 | 9,6 | 8,7 | 7,8 | 6,9 | 5,10 | 4,11 | 3,12 | 2,13 | 1,14 |
| 16 | $r_{15}$ | 15,1 | 14,2 | 13,3 | 12,4 | 11,5 | 10,6 | 9,7 | 8,8 | 7,9 | 6,10 | 5,11 | 4,12 | 3,13 | 2,14 |

FIG. 11b

| | (12) $r_9$ | (11) $r_8$ | (10) $r_7$ | (9) $r_6$ | (8) $r_5$ | (7) $r_4$ | (6) $r_3$ | (5) $r_2$ | (4) $r_1$ |
|---|---|---|---|---|---|---|---|---|---|
| | | | | | | | | | $d_1c_1b_1a_1$ |
| | | | | | | | | $d_1c_1b_1a_2 + d_1c_1b_2a_1 + d_1c_2b_1a_1$ | |
| | | | | | | | $d_1c_1b_1a_3 + d_1c_1b_2a_2 + d_1c_1b_3a_1 + d_1c_2b_1a_2 + d_1c_2b_2a_1 + d_1c_3b_1a_1$ | | |
| | | | | | | $d_1c_1b_2a_3 + d_1c_1b_3a_2 + d_1c_2b_1a_3 + d_1c_2b_2a_2 + d_1c_2b_3a_1 + d_1c_3b_1a_2 + d_1c_3b_2a_1$ 668 670 672— $d_1c_3b_2a_1$ 674 | | | |
| | | | | | $d_1c_1b_3a_3 + d_1c_2b_2a_3 + d_1c_2b_3a_2 + d_1c_3b_1a_3 + d_1c_3b_2a_2 + d_1c_3b_3a_1$ | | | | |
| | | | | $d_1c_2b_3a_3 + d_1c_3b_2a_3 + d_1c_3b_3a_2$ 664 666 | | | | | |
| | | | $d_1c_3b_3a_3$ 662 | | | | | | |
| | | | | | | | | $+ d_2c_1a_1b_1$ | |
| | | | | | | $+ d_2c_1b_1a_2 + d_2c_1b_2a_1 + d_2c_2b_1a_1$ | | | |
| | | | | | $+ d_2c_1b_1a_3 + d_2c_1b_2a_2 + d_2c_1b_3a_1 + d_2c_2b_1a_2 + d_2c_2b_2a_1 + d_2c_3b_1a_1$ | | | | |
| | | | | $d_2c_1b_2a_3 + d_2c_1b_3a_2 + d_2c_2b_1a_3 + d_2c_2b_2a_2 + d_2c_2b_3a_1 + d_2c_3b_1a_2 + d_2c_3b_2a_1$ 682 684 686 688—$d_2c_3b_2a_1$ | | | | | |
| | | | $d_2c_1b_3a_3 + d_2c_2b_2a_3 + d_2c_2b_3a_2 + d_2c_3b_1a_3 + d_2c_3b_2a_2 + d_2c_3b_3a_1$ | | | | | | |
| | | $d_2c_2b_3a_3 + d_2c_3b_2a_3 + d_2c_3b_3a_2$ 678 680 | | | | | | | |
| | $d_2c_3b_3a_3$ 676 | | | | | | | | |
| | | | | | | | $+ d_3c_1b_1a_1$ | | |
| | | | | | | $+ d_3c_1b_1a_2 + d_3c_1b_2a_1 + d_3c_2b_1a_1$ | | | |
| | | | | | $+ d_3c_1b_1a_3 + d_3c_1b_2a_2 + d_3c_1b_3a_1 + d_3c_2b_1a_2 + d_3c_2b_2a_1 + d_3c_3b_1a_1$ | | | | |
| | | | | $d_3c_1b_2a_3 + d_3c_1b_3a_2 + d_3c_2b_1a_3 + d_3c_2b_2a_2 + d_3c_2b_3a_1 + d_3c_3b_1a_2 + d_3c_3b_2a_1$ 696 698 700 702—$d_3c_3b_2a_1$ | | | | | |
| | | | $d_3c_1b_3a_3 + d_3c_2b_2a_3 + d_3c_2b_3a_2 + d_3c_3b_1a_3 + d_3c_3b_2a_2 + d_3c_3b_3a_1$ | | | | | | |
| | | $d_3c_2b_3a_3 + d_3c_3b_2a_3 + d_3c_3b_3a_2$ 692 694 | | | | | | | |
| | $d_3c_3b_3a_3$ 690 | | | | | | | | |

704) ($\Sigma m+n+o+p$)→ $r_{10}$ $r_{11}$ $r_{12}$ $r_{13}$ $r_{14}$ 600 610 612 630

METHOD AND APPARATUS FOR MULTIPLYING A PLURALITY OF NUMBERS

This is a Continuation-in-Part of U.S. application Ser. No. 08/042,825 filed Apr. 5, 1993, which will issue as U.S. Pat. No. 5,291,430 on Mar. 1, 1994; which was a Continuation-in-Part of U.S. application Ser. No. 07/924,346, filed Aug. 13, 1992, which issued as U.S. Pat. No. 5,200,912 on Apr. 6, 1993; which was a Continuation-in-Part of U.S. application Ser. No. 07/794,995, filed November 19, 1991, which issued as U.S. Pat. No. 5,136,537 on Aug. 4, 1992.

BACKGROUND OF THE INVENTION

The present invention is directed to a method for determining the product of a plurality of N numbers and an apparatus for carrying out that method.

In a computing system employing solid state components, preferably constructed from silicon components arrayed on a substrate, certain basic design criteria generally apply. For example, it is desired that the least space possible upon the substrate be occupied by each component. Further, it is desired that energy consumed by the apparatus be minimized as much as possible, especially in battery-supplied systems. Also, it is desired that the computing system operate as speedily as possible.

A multiplier for such computing systems is generally fashioned of a matrix of switching transistors, which matrix is of sufficient size to accommodate the maximum expected size of numbers to be handled by the computing apparatus. Thus, for example, in order to have a multiplication of a 4-digit number by a 4-digit number, a multiplier would necessarily comprise a 16×16 bit matrix (i.e., 16 columns of transistors, each column having 16 rows of transistors) with additional rows, or columns, or both to accommodate carries and other overhead operations involved in multiplication.

For smaller numbers, higher significance bits within the multiplier matrix are zero-filled as appropriate to correctly store the multiplicand and the multiplier involved in the multiplication operation. However, those zero-filled bits must still be powered-up in order to effect such zero-filling. Such zero-filled bits are necessarily involved in the calculations effected by the multiplier, so speed of operation, power requirements, and "real estate" (i.e., space) occupancy on the substrate are all sacrificed in accommodating larger numbers for multiplication operations.

It would be advantageous to have a multiplier which only powers-up a sufficient number of bits necessary for a specific multiplication operation to conserve power, especially in a battery-supplied system. It would be further advantageous to have a multiplier which occupies as little "real estate" as possible on the substrate in order to conserve space and enhance packaging of a system employing the multiplier. It would be still further advantageous to have a multiplier which speedily effects multiplication operations to enhance the operational speed of a system employing the multiplier.

It would also be advantageous to effect multiplication by a method which facilitates design and operation of a multiplier which can realize the above-described desired advantages.

SUMMARY OF THE INVENTION

The present invention includes a method for determining the product of a plurality of N numbers, each number of the N numbers having a plurality of digits hierarchically arranged from a least-significant digit to a most-significant digit. The method comprises, in its preferred embodiment, the steps of:

(1) determining a plurality of partial products; the plurality of partial products comprising respective partial products for each combination of the plurality of digits of each of the N numbers, each of the partial products having a combinational significance, the combinational significance being established by the significance of each digit of each of the N numbers of the combination involved in the respective partial product;

(2) providing a register having a plurality of register cells for storing accumulated values, which register cells have hierarchical significance;

(3) accumulating selected of the partial products to produce accumulated values in specified of the register cells according to the following relationships:

$$P[m,n,o,p, \ldots ] \text{ --- accumulates in} \text{ -- } r[x];$$

where:
$x = (m+n+o+p+ \ldots) - (N-1)$;
$P[m,n,o,p, \ldots ]$ represents a selected partial product;
$m$ = significance of the digit from a first number of the N numbers involved in the selected partial product, $m = 1,2,3, \ldots$ ;
$n$ = significance of the digit from a second number of the N numbers involved in the selected partial product, $n = 1,2,3, \ldots$ ;
$o$ = significance of the digit from a third number of the N numbers involved in the selected partial product, $o = 1,2,3, \ldots$ ;
$p, \ldots$ = significance of the digits from subsequent numbers involved in the selected partial product, $p$ (and each subsequent significance) $= 1,2,3, \ldots$ ;
$r[x]$ = a specified register cell having a significance "x";

(4) effecting a shifting accumulation operation comprising shifting specific digits of the accumulated value stored in a lesser-significant register cell to the next-higher-significant register cell containing an accumulated value, and adding the specific digits to the accumulated value stored in the next-higher-significant register cell as least-significant digits; the specific digits being those digits of the accumulated value stored in the lesser-significant register cell having higher significance than the least-significant digit of the accumulated value; the shifting accumulation operation being effected sequentially between significance-adjacent register cells from the least-significant register cell to the most-significant register cell within the register; and (5) reading the contents of the register to ascertain the product.

A further aspect of the present invention includes an apparatus for practicing the above-described method, which apparatus, in its preferred embodiment, comprises a logic circuit for determining the partial products for each combination of digits of the plurality of N numbers; a register having a plurality of register cells for storing accumulated values, which register cells have a hierarchical significance; and an accumulating circuit for accumulating selected of the partial products to produce accumulated values, the accumulating circuit storing the accumulated values in specified register cells according to the relationships expressed above.

It is, therefore, an object of the present invention to provide a method and apparatus for determining the product of a plurality of N numbers which facilitate powering-up only sufficient components necessary for a specific multiplication operation to conserve power consumption.

It is a further object of the present invention to provide a method and apparatus for determining the product of a plurality of N numbers which efficiently occupies space on a substrate in a system employing the apparatus.

Yet a further object of the present invention is to provide a method and apparatus for determining the product of a plurality of N numbers which speedily effects multiplication operations to enhance the operational speed of a system employing the apparatus.

Further objects and features of the present invention will be apparent from the following specification and claims when considered in connection with the accompanying drawings illustrating the preferred embodiment of the invention.

BRIEF DESCRIPTION OF THE DRAWINGS

FIG. 2 is a table illustrating the assignment of accumulated values to respective register cells according to the method of the present invention.

FIG. 7 is a schematic block diagram of an apparatus for carrying out the preferred embodiment of the method of the present invention.

DETAILED DESCRIPTION OF THE INVENTION

Figure 1:
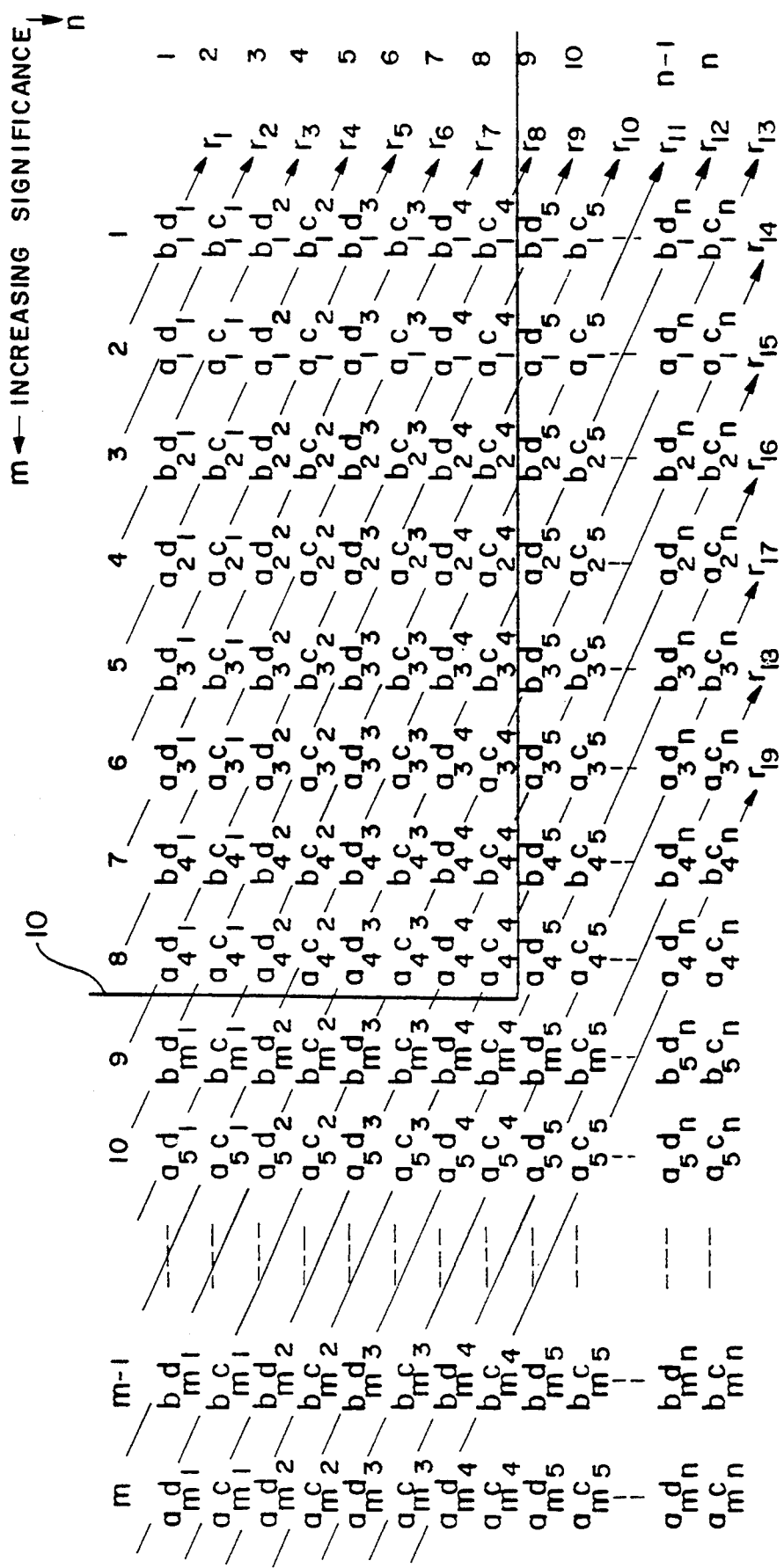
FIG. 1 is a representation of a generalized matrix for determining register set-ups according to the first embodiment of the method of the present invention.

Traditional high speed data signal processing apparatuses employ high speed multipliers to execute algorithms for purposes of such functions as speech compression, operation of high speed modems, operation of digital filters, and the like. Typically, the multipliers employed for such functions are large (on the order of a 16×16 bit array) and involve high power consumption, large die area ("real estate" occupancy on the substrate), and high precision. Other uses of multipliers, such as arithmetic logic units, generally suffer from the same disadvantages—high power consumption and large die area—in order to maintain high speed operation, and the disadvantages are exacerbated with requirements for higher speed, higher precision, and larger numbers.

The present invention includes a method for determining the product of two numbers (i.e., a method for multiplication) which comprises a distribution of multiplying operations among a plurality of smaller multipliers than the size of multiplier which would be required for multiplying with a single multiplier. Such distributive processing maintains speed of operation and precision of results while providing for a lesser die area requirement and affording the opportunity to only power-up the particular multiplying units in the distributive processing arrangement required for the particular multiplicand and multiplier involved in a specific multiplication operation.

Generally, the method involves the generation of partial products of portions of the multiplicand and multiplier, which partial products each individually require a smaller multiplier unit, and effecting a shifting accumulation operation in a register in which the partial products have been accumulated according to particular respective significances of the digits of the multiplicand and the digits of the multiplier.

In order to facilitate understanding of the terms used in describing the method of the present invention, the following terms are illustrated.

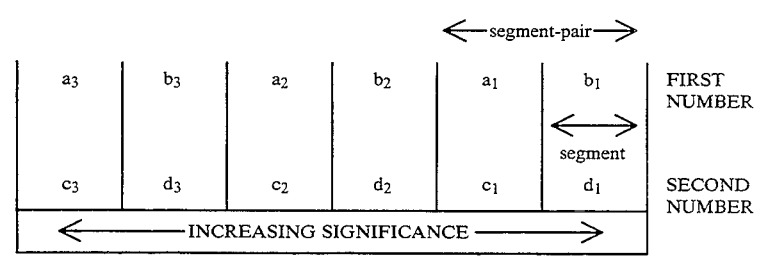

-continued

| FIRST ADDITIVE COMPRESSIONS | FIRST SUBTRACTIVE COMPRESSIONS | SECOND ADDITIVE COMPRESSIONS | SECOND SUBTRACTIVE COMPRESSIONS |
|---|---|---|---|
| $(a_1+b_1)$ | $(a_1-b_1)$ | $(c_1+d_1)$ | $(c_1-d_1)$ |
| $(a_2+b_2)$ | $(a_2-b_2)$ | $(c_2+d_2)$ | $(c_2-d_2)$ |
| $(a_3+b_3)$ | $(a_3-b_3)$ | $(c_3+d_3)$ | $(c_3-d_3)$ |
| $\vdots$ | $\vdots$ | $\vdots$ | $\vdots$ |
| $(a_m+b_m)$ | $(a_m-b_m)$ | $(c_n+d_n)$ | $(c_n-d_n)$ |

Primary Partial Products: $P1_{m,n}$ $$\begin{array}{cccc} b_1d_1 & b_2d_1 & \ldots & b_md_1 \\ b_1d_2 & b_2d_2 & \ldots & b_md_2 \\ b_1d_3 & b_2d_3 & \ldots & b_md_3 \\ \vdots & \vdots & & \vdots \\ b_1d_n & b_2d_n & \ldots & b_md_n \end{array}$$

Secondary Partial Products: $P2_{m,n}$ $$\begin{array}{cccc} (a_1+b_1)(c_1+d_1) & (a_2+b_2)(c_1+d_1) & \ldots & (a_m+b_m)(c_1+d_1) \\ (a_1+b_1)(c_2+d_2) & (a_2+b_2)(c_2+d_2) & \ldots & (a_m+b_m)(c_2+d_2) \\ (a_1+b_1)(c_3+d_3) & (a_2+b_2)(c_3+d_3) & \ldots & (a_m+b_m)(c_3+d_3) \\ \vdots & \vdots & & \vdots \\ (a_1+b_1)(c_n+d_n) & (a_2+b_2)(c_n+d_n) & \ldots & (a_m+b_m)(c_n+d_n) \end{array}$$

Tertiary Partial Products: $P3_{m,n}$ $$\begin{array}{cccc} (a_1-b_1)(c_1-d_1) & (a_2-b_2)(c_1-d_1) & \ldots & (a_m-b_m)(c_1-d_1) \\ (a_1-b_1)(c_2-d_2) & (a_2-b_2)(c_2-d_2) & \ldots & (a_m-b_m)(c_2-d_2) \\ (a_1-b_1)(c_3-d_3) & (a_2-b_2)(c_3-d_3) & \ldots & (a_m-b_m)(c_3-d_3) \\ \vdots & \vdots & & \vdots \\ (a_1-b_1)(c_n-d_n) & (a_2-b_2)(c_n-d_n) & \ldots & (a_m-b_m)(c_n-d_n) \end{array}$$

Additive Factor: $F^+_{m,n}$
$$F^+_{m,n} = [(P2_{m,n} + P3_{m,n}) \div 2] - P1_{m,n}$$

Subtractive Factor: $F^-_{m,n}$
$$F^-_{m,n} = (P2_{m,n} - P3_{m,n}) \div 2$$

According to a first embodiment of the method of the present invention, a first number and a second number are multiplied. The first number has a plurality of first digits hierarchically arranged from a least-significant place to a most-significant place, and the second number has a plurality of second digits hierarchically arranged from a least-significant place to a most-significant place. The most-significant places of the shorter of the two numbers are zero-filled appropriately that the first and second numbers occupy a like number of places. The first number is segmented into at least one first segment-pair, each of which first segment-pairs being representable by an expression "$a_m,b_m$" where "a" represents a higher-significance first segment of a respective first segment-pair and "b" represents a lower-significance first segment of the respective first segment-pair ("m"=1, 2, 3, ... ). "m" represents the significance of the respective first segment-pair within the first number. The second number is similarly segmented into at least one second segment-pair, each of which second segment-pairs being representable by an expression "$c_n,d_n$", where "c" represents a higher-significance second segment of a respective second segment-pair and "d" represents a lower-significance second segment of a respective second segment-pair ("n"=1, 2, 3, ... ). "n" represents the significance of the respective second segment-pair within the second number. Thus, the two numbers are segmented into an equal number of segment-pairs, and each of the first segments and second segments, for a given span of significance, comprise an equal number of digits.

An additive compression is calculated for each of the first segment-pairs and each of the second segment-pairs. That is, a first additive compression for each of the first segment-pairs, representable by an expression "$(a_m+b_m)$", and a second additive compression for each of the second segment-pairs, representable by an expression "$(c_n+d_n)$", are calculated. Similarly, a first subtractive compression for each of the first segment-pairs, representable by an expression "$(a_m-b_m)$", and a second subtractive compression for each of the second segment-pairs, representable by an expression "$(c_n-d_n)$", are also calculated.

A set of primary partial products, comprising the products of each lesser-significance segment of each of the first segment-pairs with each lesser-significance segment of each of the second segment-pairs, is calculated. Each primary partial product is representable by an expression "$P1_{m,n}$", where $P1_{m,n}=b_md_n$, and "m,n" establishes a combinational significance for each of the primary partial products.

A set of secondary partial products, comprising the products of each of the first additive compressions with each of the second additive compressions, is calculated. Each of the secondary partial products is representable by an expression "$P2_{m,n}$", where $P2_{m,n}=(a_m+b_m)(c_n+d_n)$, and "m,n" establishes a combinational significance for each of the secondary partial products.

A set of tertiary partial products, comprising the products of each of the first subtractive compressions with each of the second subtractive compressions, is calculated. Each of the tertiary partial products is representable by an expression "$P3_{m,n}$", where $P3_{m,n}=(a_m-b_m)(c_n-d_n)$, and "m,n" establishes a combinational significance for each of the tertiary partial products.

The sum of a specific secondary partial product with a specific tertiary partial product having the same combinational significance, is calculated. The sum thus calculated is divided by two to provide an interim result. The primary partial product having the same combinational significance as the combinational significances of the secondary and tertiary partial products used in calculating the interim result is subtracted from that interim result to produce an additive factor. Each addition factor is representable by an expression "$F_{m,n}{}^+$", where $F_{m,n}{}^+ = [(P2_{m,n} + P3_{m,n}) \div 2] - P1_{m,n}$.

The difference of a secondary partial product less a tertiary partial product having the same combinational significance, is calculated to yield an interim difference. The interim difference is divided by two to produce a subtractive factor. Each subtractive factor is representable by an expression "$F_{m,n}{}^-$", where $F_{m,n}{}^- = (P2_{m,n} - P3_{m,n}) \div 2$.

The primary partial products, the subtractive factors, and the additive factors are accumulated in a register having an array of register cells to yield an accumulated value in appropriate of the register cells. The register cells are arrayed hierarchically from a first register cell to a $(4j-1)$ register cell, where "j" represents the number of first segment-pairs. The first register cell has the lowest significance in the hierarchical arrangement, and each of the plurality of register cells is representable by $r_x$, where "x" indicates the significance of a respective register cell. The accumulation of the plurality of primary partial products in a respective register cell is effected according to the relationship:

$$P1_{m,n} = b_m d_n - [\text{accumulates in}] \rightarrow r_{2(m+n)-3}.$$

The accumulation of subtractive factors in a respective register cell is effected according to the relationship:

$$F_{m,n}{}^- - [\text{accumulates in}] \rightarrow r_{2(m+n)-2}.$$

The accumulation of the additive factors in a respective register cell is effected according to the relationship:

$$F_{m,n}{}^+ - [\text{accumulates in}] \rightarrow r_{2(m+n)-1}.$$

There is then effected a shifting accumulation operation from a lesser-significant register cell within the array of register cells to a next-higher-significance cell within the array of register cells. The shifting accumulation operation begins with the least-significant register cell and comprises shifting specific digits in the accumulated value in the lesser-significance register cell to the next-higher-significance register cell and summing the shifted digits of the higher significance as least-significant digits with the accumulated value in the next-higher-significance register cell. The specific digits to be shifted comprise all digits having higher significance than the number of least-significant digits in the accumulated value in the lesser-significance register cell equal to the number of digits in each of the first segments into which the first number is divided. The shifting accumulation operation continues from the least-significant cell and is effected sequentially between significance-adjacent register cells until the next-higher-significance register cell is the $(4j-1)$ cell, that is, the highest-significance cell having an accumulated value stored therein. The number which is stored within the array of register cells after completion of the shifting accumulation operation described above comprises the product of the first number and second number, and may be shifted out of the array of register cells for use in further processing as appropriate in the apparatus employing the method of the present invention.

The method of the present invention may be illustrated by example:

EXAMPLE I

To multiply $256 \times 256$:

(1) Segregate the multiplicand and the multiplier into segment-pairs as follows:

$$\begin{array}{r} 25\,|\,6 \\ 25\,|\,6 \\ \hline 65,5\,|\,36 \end{array} \quad \begin{array}{l} \text{Let } a = 25 \\ b = 6 \end{array} \quad \begin{array}{l} c = 25 \\ d = 6 \end{array}$$

(2) Determine additive compressions and subtractive compressions as follows:

$(a+b) = 31 \qquad (a-b) = 19$
$(c+d) = 31 \qquad (c-d) = 19$ (3) Determine a primary partial product (P1) as follows:

$bd = 36$ (4) Determine an additive factor (F+) and a subtractive factor (F−) as follows:

$(a+b)(c+d) = 31 \times 31 = 961$ [Secondary Partial Product]

$(a-b)(c-d) = 19 \times 19 = 361$ [Tertiary Partial Product]

$(a+b)(c+d) = ac + bc + ad + bd = 961 = P2$ $(a-b)(c-d) = ac - bc - ad + bd = 361 = P3$ $P2 + P3 = [(a+b)(c+d)] + [(a-b)(c-d)]$ $$\begin{aligned} P2 + P3 &= 2ac + 2bd = 1322 \\ ac + bd &= 661 \\ ac &= 661 - bd \\ ac &= 661 - 36 = 625 = F^+ \end{aligned}$$

$P2 - P3 = [(a+b)(c+d)] - [(a-b)(c-d)]$ $$\begin{aligned} P2 - P3 &= 2bc + 2ad = 600 \\ bc + ad &= 300 = F^- \end{aligned}$$

(5) Accumulation of the determined terms in a plurality of register cells, hierarchically arranged according to significance, is determined as follows:

(a) Generally, according to generally accepted methods of manual multiplication:

$$\begin{array}{r} a\ b \\ \times\ c\ d \\ \hline ad\ bd \\ ac\ bc \\ \hline [ac] + [ad + bc] + [bd] \end{array}$$

(b) Thus, the array of register cells is set up for accumulating values as follows:

|  r3  |  r2  |  r1  |
|---|---|---|
| ac | ad+bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | ad+bc | bd |
|---|---|---|
| 625 | 300 | 36 |
| 30 | 3 | |
| 655 | 303 | |

| 655 | 3 | 6 |

(7) The contents of the register contain the correct answer (65,536), and are available for further processing by shifting the contents from the array of register cells, either serially or in parallel, as appropriate.

The method gives correct results regardless of how the multiplicand and multiplier are segregated, so long as "a" and "c" have an equal number of digits (blanks are treated as zeroes), and so long as "b" and "d" have an equal number of digits:

EXAMPLE II (1) Segregate the multiplicand and the multiplier as follows:

```
1000 | 0      Let a = 1000    c = 2
X  2 | 5          b = 0       d = 5
```

(2) Determine additive compressions and subtractive compressions as follows:

$(a+b) = 1000$    $(a-b) = 1000$
$(c+d) = 7$       $(c-d) = -3$ (3) Determine a primary partial product (P1) as follows:

$bd = 0$ (4) Determine an additive factor (F+) and a subtractive factor (F−) as follows:

$(a+b)(c+d) = ac+bc+ad+bd = 7000 = P2$ $(a-b)(c-d) = ac-bc-ad+bd = -3000 = P3$ $P2+P3 = [(a+b)(c+d)]+[(a-b)(c-d)]$ $P2+P3 = 2ac+2bd = 4000$
$\qquad ac+bd = 2000$
$\qquad ac = 2000-bd$
$\qquad ac = 2000-0 = 2000 = F^+$ $P2-P3 = [(a+b)(c+d)]-[(a-b)(c-d)]$ $P2-P3 = 2bc+2ad = 10000$
$\qquad bc+ad = 5000 = F^-$ (5) Accumulation of the determined terms in a plurality of register cells, hierarchically arranged according to significance, is determined as follows:

(a) Generally, according to generally accepted methods of manual multiplication:

```
      a  b
   X  c  d
     ad bd
   ac bc
[ac]+[ad+bc]+[bd]
```

(b) Thus, the array of register cells is set up for accumulating values as follows:

|  r3  |  r2  |  r1  |
|---|---|---|
| ac | ad+bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | bc+ad | bd |
|---|---|---|
| 2000 | 5000 | 0 |
| 500 | | |
| 2500 | 0 | 0 |

| 2500 | 0 | 0 |

(7) The contents of the register contain the correct answer (250,000), and are available for further processing by shifting the contents from the array of register cells, either serially or in parallel, as appropriate.

The method accommodates larger numbers as well:

EXAMPLE III

To multiply 1,234×5,678:

(1) Segregate the multiplicand and the multiplier as follows:

```
    1,234      Let a = 12    c = 56
  X 5,678          b = 34    d = 78
    9,872
    8,638
    7,404
    6,170
```

(2) Determine additive compressions and subtractive compressions as follows:

$(a+b) = 46$    $(a-b) = -22$
$(c+d) = 134$   $(c-d) = -22$ (3) Determine a primary partial product (P1) as follows:

$$bd = 2652$$

(4) Determine an additive factor (F+) and a subtractive factor (F−) as follows:

$$(a+b)(c+d) = ac+bc+ad+bd = 6164 = P2$$

$$(a-b)(c-d) = ac-bc-ad+bd = 484 = P3$$

$$P2+P3 = [(a+b)(c+d)] + [(a-b)(c-d)]$$

$$\begin{aligned}
P2+P3 &= 2ac+2bd = 6648 \\
ac+bd &= 3324 \\
ac &= 3324-bd \\
ac &= 3324-2652 = 672 = F^+
\end{aligned}$$

$$P2-P3 = [(a+b)(c+d)] - [(a-b)(c-d)]$$

$$\begin{aligned}
P2-P3 &= 2bc+2ad = 5680 \\
bc+ad &= 2840 = F^-
\end{aligned}$$

(5) Accumulation of the determined terms in a plurality of register cells, hierarchically arranged according to significance, is determined as follows:
 (a) Generally, according to generally accepted methods of manual multiplication:

```
       a  b
     × c  d
     ─────
      ad bd
   ac bc
  ─────────────
  [ac]+[ad+bc]+[bd]
```

(b) Thus, the array of register cells is set up for accumulating values as follows:

| r3 | r2 | r1 |
|---|---|---|
| ac | ad+bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | bc+ad | bd |
|---|---|---|
| 672 | 2840 | 2652 |
| 28 | 26 | |
| 700 | 2866 | |
| 700 | 66 | 52 |

(7) The contents of the register contain the correct answer (7,006,652), and are available for further processing by shifting the contents from the array of register cells, either serially or in parallel, as appropriate.

The method operates for numbers other than base 10 numbers. For example, to multiply 135×214 (Base 7 Numbers):

EXAMPLE IV (Base 7 Numbers)

(1) Segregate the multiplicand and the multiplier as follows:

(1) Segregate the multiplicand and the multiplier as follows:

```
   7²  7¹  7⁰     Let a = 13   c = 21
    |   |   |         b = 5    d = 4
    |   |   |
    |   |   |
    1   3   5
    2   1   4
   ─────────
    6   0   6
    1   3   5
    3   0   3
   ─────────
    3   2   5   5   6
```

(2) Determine additive compressions and subtractive compressions as follows:

$$(a+b) = 21 \quad (a-b) = 5$$
$$(c+d) = 25 \quad (c-d) = 14$$

(3) Determine a primary partial product (P1) as follows:

$$bd = 26$$

(4) Determine an additive factor (F+) and a subtractive factor (F−) as follows:

$$(a+b)(c+d) = ac+bc+ad+bd = 555 = P2$$

$$(a-b)(c-d) = ac-bc-ad+bd = 106 = P3$$

$$P2+P3 = [(a+b)(c+d)] + [(a-b)(c-d)]$$

$$\begin{aligned}
P2+P3 &= 2ac+2bd = 664 \\
ac+bd &= 332 \\
ac &= 332-bd \\
ac &= 332-26 = 303 = F^+
\end{aligned}$$

$$P2-P3 = [(a+b)(c+d)] - [(a-b)(c-d)]$$

$$\begin{aligned}
P2-P3 &= 2bc+2ad = 446 \\
bc+ad &= 223 = F^-
\end{aligned}$$

(5) Accumulation of the determined terms in a plurality of register cells, hierarchically arranged according to significance, is determined as follows:
 (a) Generally, according to generally accepted methods of manual multiplication:

```
       a  b
     × c  d
     ─────
      ad bd
   ac bc
  ─────────────
  [ac]+[ad+bc]+[bd]
```

(b) Thus, the array of register cells is set up for accumulating values as follows:

| $r_3$ | $r_2$ | $r_1$ |
|---|---|---|
| ac | ad+bc | bd |

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "b", "b" and "d" are required to have an equal number of digits.

| ac | bc+ad | bd |
|---|---|---|
| 303 | 223 | 26 |
| 22 | 2 | |
| 325 | 225 | |
| 325 | 5 | 6 |

(7) The contents of the register contain the correct answer (32,556), and are available for further processing by shifting the contents from the array of register cells, either serially or in parallel, as appropriate.

The method can be extended to more fully segregate the multiplicand and the multiplier to further distribute the multiplication operation and thereby employ even smaller multipliers in distributive processing:

EXAMPLE V (1) Segregate the multiplicand and the multiplier as follows:

```
    1,234      Let a1 = 3    a2 = 1
  × 5,678         b1 = 4    b2 = 2
    9,872         c1 = 7    c2 = 5
    8,638         d1 = 8    d2 = 6
    7,404
    6,170
  7,006,652
```

(2) Determine additive compressions and subtractive compressions as follows:

Then: $(a_1+b_1) = 7 \quad (a_2+b_2) = 3$  [1]
$(c_1+d_1) = 15 \quad (c_2+d_2) = 11$
$(a_1-b_1) = -1 \quad (a_2-b_2) = -1$
$(c_1-d_1) = -1 \quad (c_2-d_2) = -1$ (3) Determine primary partial products ($P1_{m,n}$) as follows:

$P1_{1,1} = b_1d_1 = 32 \quad P1_{2,1} = b_2d_1 = 16$  [2]
$P1_{1,2} = b_1d_2 = 24 \quad P1_{2,2} = b_2d_2 = 12$ (4) Determine additive factors ($F_{m,n}^+$) and subtractive factors ($F_{m,n}^-$) as follows:

(a) $(a_1+b_1)(c_1+d_1) = a_1c_1+b_1c_1+a_1d_1+b_1d_1 = 105 = P2_{1,1}$
$(a_1-b_1)(c_1-d_1) = a_1c_1-b_1c_1-a_1d_1+b_1d_1 = +1 = P3_{1,1}$ $P2_{1,1}+P3_{1,1} = [(a_1+b_1)(c_1+d_1)]+[(a_1-b_1)(c_1-d_1)]$ $P2_{1,1}+P3_{1,1} = 2a_1c_1 + 2b_1d_1 = 106$
$a_1c_1 + b_1d_1 = 53$
$a_1c_1 = 53-b_1d_1$
$a_1c_1 = 53-32 = 21 = F_{1,1}^+$ $P2_{1,1}-P3_{1,1} = 2b_1c_1 + 2a_1d_1 = 104$  [4]
$b_1c_1 + a_1d_1 = 52 = F_{1,1}^-$ (b) $(a_1+b_1)(c_2+d_2) = a_1c_2+b_1c_2+a_1d_2+b_1d_2 = 77 = P2_{1,2}$
$(a_1-b_1)(c_2-d_2) = a_1c_2-b_1c_2-a_1d_2+b_1d_2 = +1 = P3_{1,2}$ $P2_{1,2}+P3_{1,2} = [(a_1+b_1)(c_2+d_2)]+[(a_1-b_1)(c_2-d_2)]$ $P2_{1,2}+P3_{1,2} = 2a_1c_2 + 2b_1d_2 = 78$
$a_1c_2 + b_1d_2 = 39$
$a_1c_2 = 39-b_1d_2$
$a_1c_2 = 39-24 = 15 = F_{1,2}^+$ $P2_{1,2}-P3_{1,2} = [(a_1+b_1)(c_2+d_2)]-[(a_1-b_1)(c_2-d_2)]$ $P2_{1,2}-P3_{1,2} = 2b_1c_2 + 2a_1d_2 = 76$
$b_1c_2 + a_1d_2 = 38 = F_{1,2}^-$ (c) $(a_2+b_2)(c_1+d_1) = a_2c_1+b_2c_1+a_2d_1+b_2d_1 = 45 = P2_{2,1}$
$(a_2-b_2)(c_1-d_1) = a_2c_1-b_2c_1-a_2d_1+b_2d_1 = +1 = P3_{2,1}$ $P2_{2,1}+P3_{2,1} = [(a_2+b_2)(c_1+d_1)]+[(a_2-b_2)(c_1-d_1)]$ $P2_{2,1}+P3_{2,1} = 2a_2c_1 + 2b_2d_1 = 46$
$a_2c_1 + b_2d_1 = 23$
$a_2c_1 = 23-b_2d_1$
$a_2c_1 = 23-16 = 7 = F_{2,1}^+$ $P2_{2,1}-P3_{2,1} = [(a_2+b_2)(c_1+d_1)]-[(a_2-b_2)(c_1-d_1)]$ $P2_{2,1}-P3_{2,1} = 2b_2c_1 + 2a_2d_1 = 44$
$b_2c_1 + a_2d_1 = 22 = F_{2,1}^-$ (d) $(a_2+b_2)(c_2+d_2) = a_2c_2+b_2c_2+a_2d_2+b_2d_2 = 33 = P2_{2,2}$
$(a_2-b_2)(c_2-d_2) = a_2c_2-b_2c_2-a_2d_2+b_2d_2 = +1 = P3_{2,2}$ $P2_{2,2}+P3_{2,2} = [(a_2+b_2)(c_2+d_2)]+[(a_2-b_2)(c_2-d_2)]$ $P2_{2,2}+P3_{2,2} = 2a_2c_2 + 2b_2d_2 = 34$
$a_2c_2 + b_2d_2 = 17$
$a_2c_2 = 17-b_2d_2$
$a_2c_2 = 17-12 = 5 = F_{2,2}^+$ $P2_{2,2}-P3_{2,2} = [(a_2+b_2)(c_2+d_2)]-[(a_2-b_2)(c_2-d_2)]$ $P2_{2,2}-P3_{2,2} = 2b_2c_2 + 2a_2d_2 = 32$
$b_2c_2 + a_2d_2 = 16 = F_{2,2}^-$ (5) Accumulation of the determined terms in a plurality of register cells, hierarchically arranged according to significance, is determined as follows:
(a) Generally, according to generally accepted methods of manual multiplication:

|   |   |   | × | $a_2$ $c_2$ | $b_2$ $d_2$ | $a_1$ $c_1$ | $b_1$ $d_1$ |
|---|---|---|---|---|---|---|---|
|   |   | $c_1a_2$ |   | $d_1a_2$ $c_1b_2$ | $d_1b_2$ $c_1a_2$ | $d_1a_2$ $c_1b_1$ | $b_1d_2$ |
|   | $d_2a_2$ $c_2b_2$ |   | $d_2b_2$ $c_2a_1$ |   | $d_2a_1$ $c_2b_1$ |   | $d_2b_1$ |   |   |
| $c_2a_2$ $a_2c_2$ + | $[a_2d_2+b_2c_2]$ + | $[a_2c_1+b_2d_2+a_1c_2]$ + | $[a_2d_1b_2c_1+a_1d_2+b_1c_2]$ + | $[b_2d_1+a_1c_1+b_1d_2]$ + | $[a_1d_2+b_1c_1]$ | $+b_1d_1$ |

(b) Thus, the array of register cells is set up for accumulating values as follows:

| $r_7$ | $r_6$ | $r_5$ | $r_4$ | $r_3$ | $r_2$ | $r_1$ |
|---|---|---|---|---|---|---|
| $a_2c_2$ + | $[a_2d_2+b_2c_2]$ + | $[a_2c_1+b_2d_2+a_1c_2]$ + | $[a_2d_1b_2c_1+a_1d_2+b_1c_2]$ + | $[b_2d_1+a_1c_1+b_1d_2]$ + | $[a_1d_2+b_1c_1]$ | $+b_1d_1$ |

**

(6) The next step is to effect a shifting accumulating operation, shifting specific digits from a lesser-significant register cell's accumulated value to the next-higher significance register cell, and adding those shifted specific digits to the accumulated value in the next-higher-significance register cell as least-significant digits. The shifted specific digits are all those digits having higher significance than the number of digits in "$b_m$", "$b_m$" and "$d_n$" are required to have an equal number of digits.

| 5 | 16 | 7 12 15 | 22 38 | 16 21 24 | 52 | 32 |
|---|---|---|---|---|---|---|

COMBINE TERM FACTORS AND EFFECT SHIFTING ACCUMULATION

| 5 | 16 | 34 | 60 | 61 | 52 | 32 |
|---|---|---|---|---|---|---|
| 2 | 4 | 6 | 6 | 5 | 3 |   |
| 7 | 20 | 40 | 66 | 66 | 55 |   |
|   |   |   |   |   |   |   |
| 7 | 0 | 0 | 6 | 6 | 5 | 2 |

(7) The contents of the register contain the correct answer (7,006,652), and are available for further processing by shifting the contents from the array of register cells, either serially or in parallel, as appropriate.

Inspection of the generally accepted manual method of multiplication reveals a simplified approach to the above-described method of the present invention and gives rise to an alternate embodiment of that method. Specifically, for example, for a 4-digit number, the register set-up is determined as:

|   |   |   | x | $a_2$ $c_2$ | $b_2$ $d_2$ | $a_1$ $c_1$ | $b_1$ $d_1$ |
|---|---|---|---|---|---|---|---|
|   |   |   |   | $a_2d_1$ $a_2c_1$ $b_2c_1$ | $b_2d_1$ $a_1c_1$ | $a_1d_1$ $b_1c_1$ | $b_1d_1$ |
|   |   | $a_2d_2$ $b_2d_2$ |   |  $a_1d_2$ $b_1c_2$ |   |   |   |
|   | $a_2c_2$ | $b_2c_2$ | $a_1c_1$ |   |   |   |   |
| Register Cell | $r_7$ | $r_6$ | $r_5$ | $r_4$ | $r_3$ | $r_2$ | $r_1$ |

The "skewed matrix" resulting from such an application of a manual multiplication technique may be written as a square matrix: (4-digit number, n=2)

| $a_2d_1$ | $b_2d_1$ | $a_1d_1$ | $b_1d_1$ |
| $a_2c_1$ | $b_2c_1$ | $a_1c_1$ | $b_1c_1$ |
| $a_2d_2$ | $b_2d_2$ | $a_1d_2$ | $b_1d_2$ |
| $a_2c_2$ | $b_2c_2$ | $a_1c_2$ | $b_1c_2$ |

The register set-up previously described in connection with the first embodiment of the method of the present invention is found on the diagonals. Note that the Primary Partial Products ($P1_{m,n}$), the Additive Factors ($F_{m,n}{}^+$), and the Subtractive Factors ($F_{m,n}{}^-$) are found on diagonals also.

← columns

|  | -4- | -3- | -2- | -1- | rows ↓ |
|---|---|---|---|---|---|
|  | $a_2d_1$ | $b_2d_1$ | $a_1d_1$ | $b_1d$ | -1- |
|  | $a_2c_1$ | $b_2c_1$ | $a_1c_1$ | $b_1c_1$ | -2- |
|  | $a_2d_2$ | $b_2d_2$ | $a_1d_2$ | $b_1d_2$ | -3- |
|  | $a_2c_2$ | $b_2c_2$ | $a_1c_2$ | $b_1c_2$ | -4- |

That is, a diagonal extending through (Col. 1, Row 1) contains $P1_{1,1}$ ($b_1d_1$); values on this diagonal accumulate in register cell $r_1$.

The diagonal extending from (Col. 2, Row 1) to (Col. 1, Row 2) contains $F_{1,1}{}^-(a_1d_1+b_1c_1)$; values on this diagonal accumulate in register cell $r_2$.

The diagonal extending from (Col. 3, Row 1) to (Col. 1, Row 3) contains $P1_{2,1}$ ($b_2d_1$); $F_{1,1}{}^-(a_1c_1)$, and $P1_{1,2}$ ($b_1d_2$); values on this diagonal accumulate in register cell $r_3$.

The diagonal extending from (Col. 4, Row 1) to (Col. 1, Row 4) contains $F_{2,1}{}^-(a_2d_1+b_2c_1)$ and $F_{1,2}{}^-(a_1d_2+b_1c_2)$; values on this diagonal accumulate in register cell $r_4$.

The diagonal extending from (Col. 4, Row 2) to (Col. 2, Row 4) contains $F_{2,1}{}^+(a_2c_1)$, $P1_{2,2}$ ($b_2d_2$), and $F_{1,2}{}^+(a_1c_2)$; values on this diagonal accumulate in register cell $r_5$.

The diagonal extending from (Col. 4, Row 3) to (Col. 3, Row 4) contains $F_{2,2}^{-}(a_2d_2+b_2c_2)$; values on this diagonal accumulate in register cell $r_6$.

A diagonal through (Col. 4, Row 4) contains $F_{2,2}^{+}(a_2c_2)$; values on this diagonal accumulate in register cell $r_7$.

Thus, for example, for a 6-digit number, where $n=3$, a square matrix may be set-up as follows:

```
                        ← columns
                                            rows ↓
  -6-      -5-      -4-      -3-     -1-     -1-
  a₃d₁    b₃d₁    a₂d₁    b₂d₁    a₁d₁   b₁d₁    -1-
  a₃c₁    b₃c₁    a₂c₁    b₂c₁    a₁c₁   b₁c₁    -2-
  a₃d₂    b₃d₂    a₂d₂    b₂d₂    a₁d₂   b₁d₂    -3-
  a₃c₂    b₃c₂    a₂c₂    b₂c₂    a₁c₂   b₁c₂    -4-
  a₃d₃    b₃d₃    a₂d₃    b₂d₃    a₁d₃   b₁d₃    -5-
  a₃c₃    b₃c₃    a₂c₃    b₂c₃    a₁c₃   b₁c₃    -6-
```

Also, for example, for an 8-digit number, where $n=4$, a square matrix may be set-up as follows:

```
                                 ← columns
                                                  rows
                                                    ↓
  -8-     -7-     -6-     -5-     -4-     -3-     -2-     -1-
  a₄d₁   b₄d₁   a₃d₁   b₃d₁   a₂d₁   b₂d₁   a₁d₁   b₁d₁   -1-
  a₄c₁   b₄c₁   a₃c₁   b₃c₁   a₂c₁   b₂c₁   a₁c₁   b₁c₁   -2-
  a₄d₂   b₄d₂   a₃d₂   b₃d₂   a₂d₂   b₂d₂   a₁d₂   b₁d₂   -3-
  a₄c₂   b₄c₂   a₃c₂   b₃c₂   a₂c₂   b₂c₂   a₁c₂   b₁c₂   -4-
  a₄d₃   b₄d₃   a₃d₃   b₃d₃   a₂d₃   b₂d₃   a₁d₃   b₁d₃   -5-
  a₄c₃   b₄c₃   a₃c₃   b₃c₃   a₂c₃   b₂c₃   a₁c₃   b₁c₃   -6-
  a₄d₄   b₄d₄   a₃d₄   b₃d₄   a₂d₄   b₂d₄   a₁d₄   b₁d₄   -7-
  a₄c₄   b₄c₄   a₃c₄   b₃c₄   a₂c₄   b₂c₄   a₁c₄   b₁c₄   -8-
```

The register set-ups may be seen to lie along diagonals, and may be expressed in the following format (cases for $n=2$, $n=3$, and $n=4$ are tabulated for ease of comparison):

significance, from the top to the bottom of the square matrix.

The terms to be accumulated in respective registers $r_x$ are indicated as being found on parallel diagonals. For example, for the case of a number divided into four first segment-pairs and four second segment-pairs (i.e., where $m=4$ and $n=4$), a square matrix of eight columns and eight rows will provide the elements to be accumulated in respective registers along its diagonals running from (Col. m, Row 1) to (Col. 1, Row n), where $m=n$. Only those terms falling within the square $8 \times 8$ matrix (delineated by bold line 10 in FIG. 1) along the various diagonals will be accumulated in the appropriate registers. Once accumulation is effected, the shifting accumulation operation previously described in connection with the first embodiment of the method of the present invention is carried out.

Comparing the (column, row) numbers, instead of the subscripts (m,n) indicating combinational significance for the segment-pairs of the multiplicand and multiplier with register numbers, one can, by inspection, observe that the accumulation of terms, or partial products, in register cells is effected according to the diagram illustrated in FIG. 2. Referring to FIG. 2, registers $r_x$ are

| | $r_{15}$ | $r_{14}$ | $r_{13}$ | $r_{12}$ | $r_{11}$ | $r_{10}$ | $r_9$ | $r_8$ | $r_7$ | $r_6$ | $r_5$ | $r_4$ | $r_3$ | $r_2$ | 1 |
|---|---|---|---|---|---|---|---|---|---|---|---|---|---|---|---|
| n = 2 | | | | | | | | | $F^+_{2,2}$ | $F^-_{2,2}$ | $Pl_{2,2}$ | $F^-_{1,2}$ | $Pl_{1,2}$ | $F^-_{1,1}$ | $Pl_{1,1}$ |
| | | | | | | | | | | | $F^+_{1,2}$ | $F^-_{2,1}$ | $Pl_{2,1}$ | | |
| | | | | | | | | | | | $F^+_{2,1}$ | | $F^+_{1,1}$ | | |
| n = 3 | | | | | | $F^+_{3,3}$ | $F^-_{3,3}$ | $Pl_{3,3}$ | $F^-_{2,3}$ | $Pl_{2,3}$ | $F^-_{1,3}$ | $Pl_{1,3}$ | $F^-_{1,2}$ | $Pl_{1,2}$ | $F^-_{1,1}$ | $Pl_{1,1}$ |
| | | | | | | | $F^+_{2,3}$ | $F^-_{3,2}$ | $Pl_{3,2}$ | $F^-_{3,1}$ | $Pl_{2,2}$ | $F^-_{2,1}$ | $Pl_{2,1}$ | | |
| | | | | | | | $F^+_{3,2}$ | | $F^+_{1,3}$ | $F^-_{2,2}$ | $Pl_{3,1}$ | | $F^+_{1,1}$ | | |
| | | | | | | | | | $F^+_{3,1}$ | | $F^+_{1,2}$ | | | | |
| | | | | | | | | | $F^+_{2,2}$ | | $F^+_{2,1}$ | | | | |
| n = 4 | $F^+_{4,4}$ | $F^-_{4,4}$ | $Pl_{4,4}$ | $F^-_{3,4}$ | $Pl_{3,4}$ | $F^-_{2,4}$ | $Pl_{2,4}$ | $F^-_{1,4}$ | $Pl_{1,4}$ | $F^-_{1,3}$ | $Pl_{1,3}$ | $F^-_{1,2}$ | $Pl_{1,2}$ | $F^-_{1,1}$ | $Pl_{1,1}$ |
| | | $F^+_{3,4}$ | $F^-_{4,3}$ | $Pl_{4,3}$ | $F^-_{3,3}$ | $Pl_{3,3}$ | $F^-_{2,3}$ | $Pl_{2,3}$ | $F^-_{3,1}$ | $Pl_{2,2}$ | $F^-_{2,1}$ | $Pl_{2,1}$ | | | |
| | | $F^+_{4,3}$ | | $F^+_{2,4}$ | $F^-_{4,2}$ | $Pl_{4,2}$ | $F^-_{3,2}$ | $Pl_{3,2}$ | $F^-_{2,2}$ | $Pl_{3,1}$ | | $F^+_{1,1}$ | | | |
| | | | | $F^+_{3,3}$ | | $F^+_{1,4}$ | $F^-_{4,1}$ | $Pl_{4,1}$ | | $F^+_{1,2}$ | | | | | |
| | | | | $F^+_{4,2}$ | | $F^+_{2,3}$ | | $F^+_{1,3}$ | | $F^+_{2,1}$ | | | | | |
| | | | | | | $F^+_{3,2}$ | | $F^+_{3,1}$ | | | | | | | |
| | | | | | | $F^+_{4,1}$ | | $F^+_{2,2}$ | | | | | | | |

By inspection, the register set-up may be recognized as being effected according to the following relationships:

Primary Partial Products: $Pl_{m,n}$—[assigned to]→$r_{2(m+n)-3}$

Subtractive Factors: $F_{m,n}^{-}$—[assigned to]→$r_{2(m+n)-2}$

Additive Factors: $F_{m,n}^{+}$—[assigned to ]→$r_{2(m+n)-1}$

A generalized case of a square matrix for determining register set-ups for multiplication of a first number and a second number according to the first embodiment of the method of the present invention is illustrated in FIG. 1. In FIG. 1, Columns numbered 1 through m are shown, indicating increasing significance from right to left, across the top of the square matrix; Rows numbered 1 through n are also shown, indicating increasing listed with the (column, row) location of the partial products to be accumulated in the respective registers tabulated co-linearly with the respective register to the right of the register $r_x$ into which they are accumulated. The sum of the column number and row number of each of the partial products accumulated within a respective register is tabulated co-linearly to the left of the respective register number, $r_x$. Inspection reveals that the (column, row) number sum ($\Sigma m+n$) always equals the register designation, x, increased by one. That is, $m+n=x+1$. Therefore, the register $r_x$ into which a given partial product is to be accumulated may be entirely determined by ascertaining its (column, row) location within an appropriate square matrix.

Accordingly, a simpler, preferred method for determining the product of two numbers according to the present invention does not require segmenting the multiplicand and multiplier into segment-pairs. According to the preferred method of the present invention, a first number (e.g., the multiplicand) has a plurality of first digits hierarchically arranged from a first least-significant place to a first most-significant place, and a second number (e.g., the multiplier) has a plurality of second digits hierarchically arranged from a second least-significant place to a second most-significant place. The preferred method comprises the steps of determining a plurality of partial products (treating blank places of the shorter of the two numbers as zeroes while determining the plurality of partial products), which plurality of partial products comprises a respective partial product for each pair-combination of the first digits and second digits. Each respective partial product thus has a combinational significance which is established by the significance of the first digit of the pair-combination involved in the respective partial product and by the significance of the second digit of the pair-combination involved in the respective partial product. A register is provided for storing information, which register has a plurality of register cells for storing accumulated values, each register cell having a hierarchical significance. Selected partial products are accumulated to produce accumulated values in specified register cells according to the following relationship:

$$P_{m,n} \text{—[accumulates in]} \to r_x; \quad x = (m+n) - 1$$

where "$P_{m,n}$" represents a respective partial product, "m" represents the significance of the first digit of the pair-combination involved in the respective partial product (m = 1, 2, 3, . . . ), "n" represents the significance of the second digit of the pair-combination involved in the respective partial product (n = 1, 2, 3, . . . ), and "$r_x$" represents a specified register cell having a significance "x".

Then a shifting accumulation operation is effected in the register. The shifting accumulation operation comprises shifting specific digits of the accumulated value stored in a lesser-significant register cell to the next-higher-significant register cell of the register cells containing an accumulated value, and adding the specific digits to the accumulated value stored in the next-higher-significant register cell as least-significant digits. The specific digits shifted are those digits of the accumulated value stored in the lesser-significant register cell having higher significance than the least-significant digit of the accumulated value. The shifting accumulation operation is effected sequentially between significance-adjacent register cells from the least-significant register cell to the most-significant register cell containing an accumulated value. The result contained within the array of register cells after completion of the shifting accumulation operation is the product of the multiplicand and multiplier and is available for shifting, serially or in parallel, as required for further processing. The significance of the respective digits of the multiplicand and multiplier directly determine the location of each partial product in a square matrix, and the location in the square matrix determines into which register cell each partial product is accumulated for the shifting accumulation operation.

In fact, with the proper apparatus for practicing this preferred method, no matrix is required. The significances of the first digit and the second digit involved in a respective partial product determine into which register cell the partial product is to be accumulated according to the relationship, $x = (m+n) - 1$.

Figure 3:
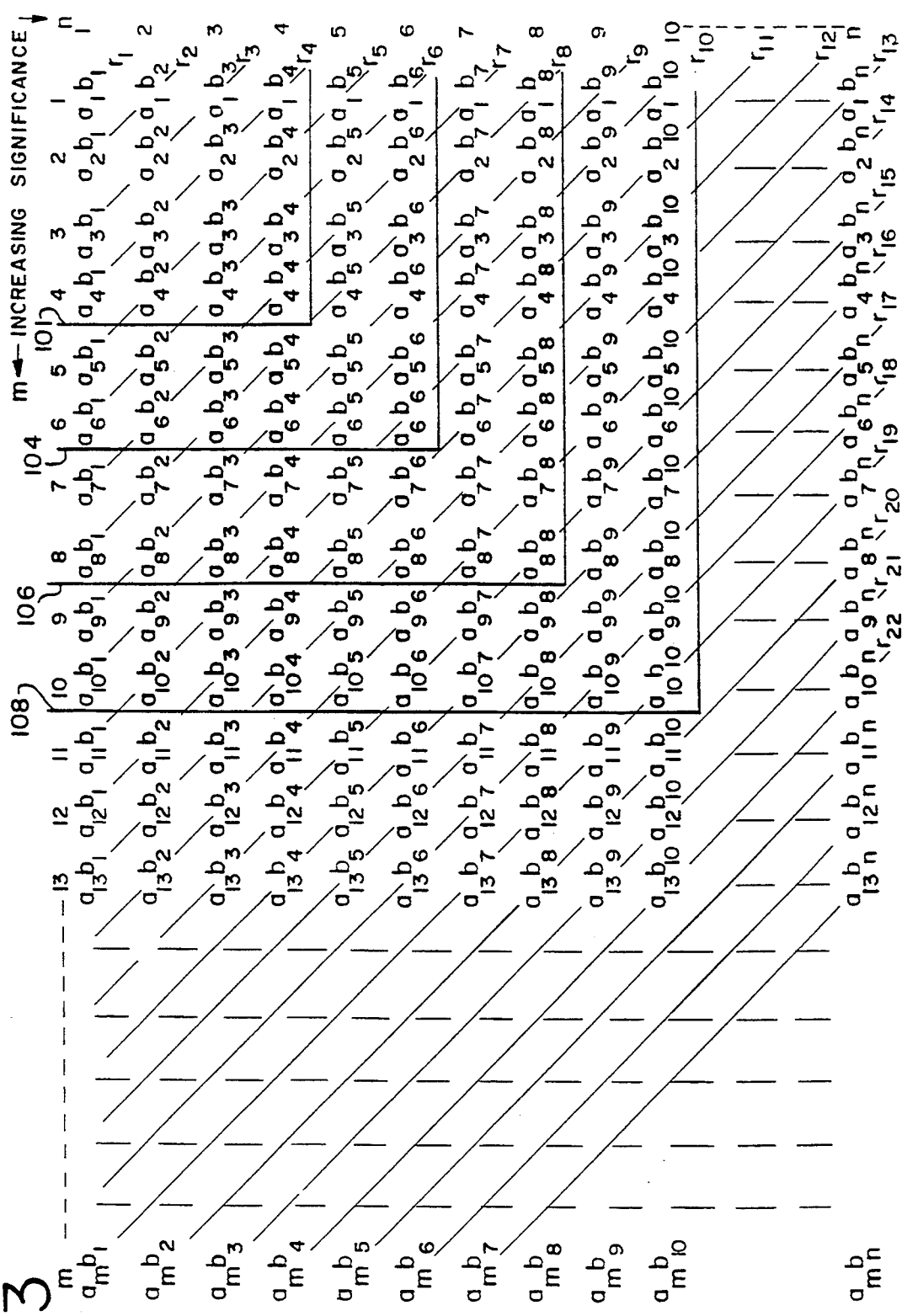
FIG. 3 is a representation of a generalized matrix for determining register set-ups according to the preferred embodiment of the method of the present invention.

FIG. 3 is a representation of a generalized square matrix for determining register set-ups according to the preferred method of the present invention. In FIG. 3, digits of a first number (e.g., the multiplicand) are indicated as $a_m$ ("m" indicates the significance of the first digit; m = 1, 2, 3, . . . ) and digits of a second number (e.g., the multiplier) are indicated as $b_n$ ("n" indicates the significance of the second digit; n = 1, 2, 3, . . . ). By such arrangement, the significances of the respective first digits are directly correlative with the column number of the square matrix of FIG. 3, and the significances of the respective second digits are directly correlative with the row number of the square matrix of FIG. 3. Accordingly, a four-digit number may be represented by the 4×4 square matrix included within bold line 101, and diagonals running from (Col. m, Row 1) to (Col. 1, Row n), where m = n, in the generalized square matrix of FIG. 3 identify partial products within the 4×4 matrix defined by bold line 101 to be accumulated in specified register cells, $r_x$. The matrix illustrated in FIG. 3 is not essential to the practice of the preferred method, but is helpful in illustrating and explaining the practice of the method. That is, placement of partial products within the square matrix of FIG. 3 is entirely dependent upon the combinational significance of the first digit and second digit of the pair-combination involved in a respective partial product; the (column, row) designation (m,n) entirely identifies the respective register cell into which a respective partial product is to be accumulated. Therefore, the combinational significance of a respective partial product entirely identifies the register cell into which the respective partial product is to be accumulated, and no matrix need be employed as an interim step or device for determining the register cell in which a respective partial product is to be accumulated.

In similar fashion, the product of a 6-digit multiplicand and a 6-digit multiplier can be determined by a square matrix defined by bold line 104 in FIG. 3 defining a 6×6 square matrix. The product of an 8-digit multiplicand and an 8-digit multiplier can be determined according to the preferred method of the present invention by a square 8×8 matrix defined by bold line 106 in FIG. 3; the product of a 10-digit multiplicand and a 10-digit multiplier may be determined by the square 10×10 matrix defined by bold line 108 in FIG. 3.

Thus, certain design parameters of a system for multiplying two numbers can be easily ascertained merely by knowing the expected size of multiplicand-multiplier operations to be accommodated by the system. For example, referring again to FIG. 3, the diagonal indicating accumulation of terms in register $r_7$ passes through (column, row) position (4,4); a designer need only know that either the multiplicand or the multiplier will comprise 4 digits. Knowing that, and calculating $\Sigma m + n = x + 1$ yields x = 7. Thus, merely knowing that four digits will be involved in multiplication enables a designer to determine that he will be required to provide an array of 7 register cells to accommodate the preferred method of the present invention for a 4-digit multiplicand and 4-digit multiplier operation. Also, by determining the size of numbers required for a given multiplicand-multiplier operation, one can determine the number of multipliers required for determining the respective partial products involved in practicing the preferred method of the present invention. That is, for a 4-digit operation (requiring a 4×4 matrix), 16 partial products are calculated. A system designer may choose to provide 16 multipliers, thereby allowing single-clock cycle determination of the 16 partial products required, or a lesser number of multipliers may be provided to enable multi-clock cycle determination of the required 16 partial products. Moreover, since single-digit multiplications only are involved in determining partial products, only 4×4 multipliers are required. Thus, instead of a 256-bit (i.e., 16×16) multiplier for 4-digit multiplication operations, as would be required for a prior art multiplier apparatus, a designer may opt to employ only eight 4×4 multipliers (i.e., only 8×4×4=128 bits of area occupied) and save "real estate".

Still further, control software or hardware may be programmed to power-up only the multipliers and register cells needed for a particular multiplication operation. Thus, for example, a 4×4 system may accommodate a 2-digit multiplication operation and only power-up the necessary multipliers (i.e., only m×n=2×2=4 multipliers are required), and only the necessary register cells need be powered-up (i.e., only (m+n−1=2+2−1=3 register cells are required).

Proper selection of the number of multipliers employed in distributive determination of partial products may actually speed the multiplication operation since numerous lower order multiplication operations to determine partial products occur simultaneously. Thus, if a designer elects to accommodate 4×4 multiplication operation (i.e., to multiply 4-digit numbers) using sixteen 4×4 multipliers (real estate occupancy=16×4×4=256 bits), while no real estate occupancy advantage is realized over the prior art, the multiplication operation will be completed in fewer clock cycles.

Another aspect of the present invention is an apparatus for carrying out the method of the present invention.

Figure 4:
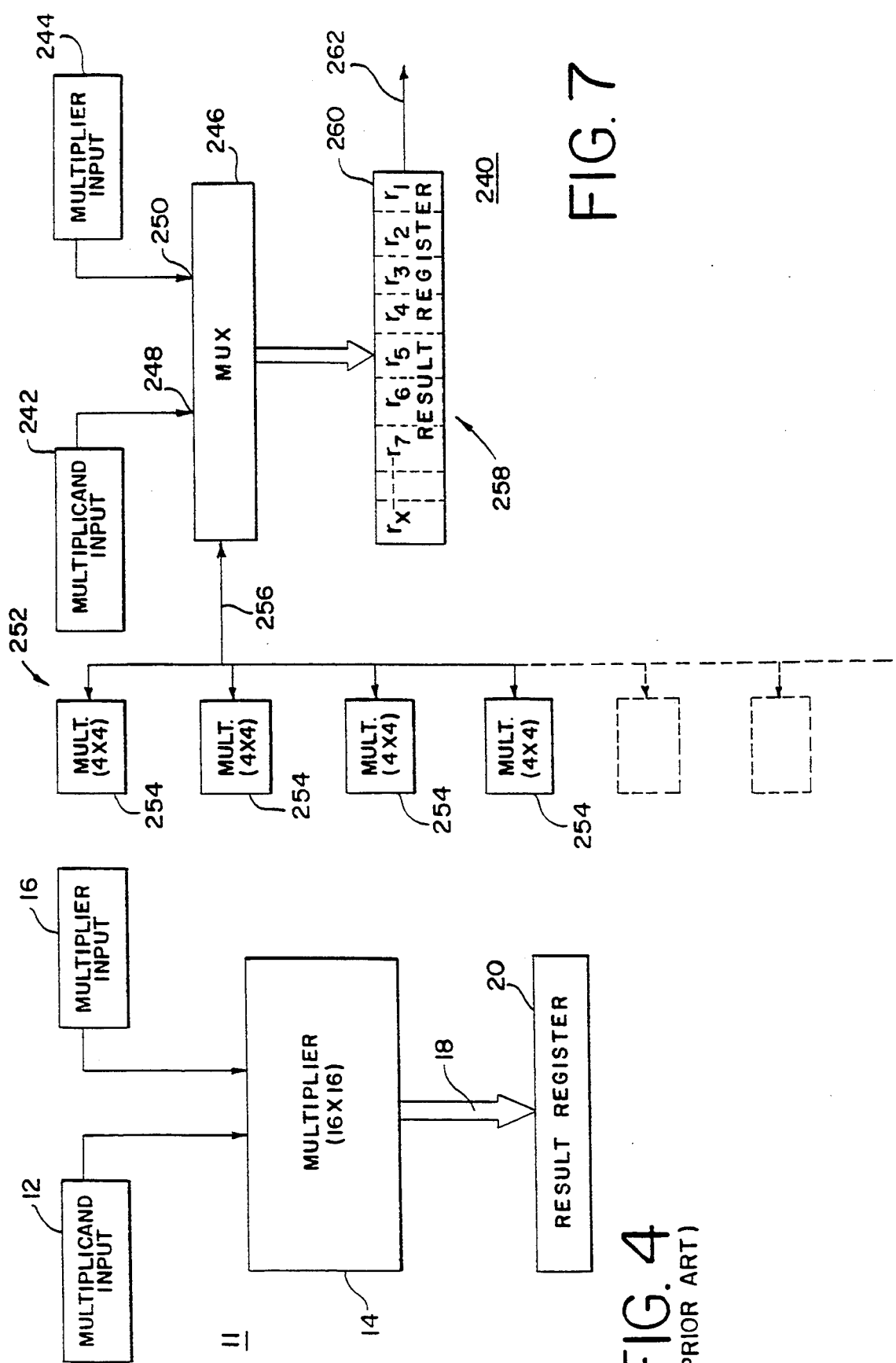
FIG. 4 is a schematic block diagram of a prior art apparatus for determining the product of two numbers.

FIG. 4 is a schematic block diagram of a prior art apparatus for determining the product of two numbers. In FIG. 4, a multiplier apparatus 11 is illustrated comprising a multiplicand input 12 providing a multiplicand to a multiplier unit 14 and a multiplier input 16 providing a multiplier to multiplier unit 14. Multiplier unit 14 produces a result representing the product of the multiplicand and the multiplier via bus 18 to a result register 20. Multiplier unit 14 is large enough to accommodate a predetermined size of multiplicand and multiplier. For example, to accommodate a 4-digit multiplicand and a 4-digit multiplier, multiplier unit 14 must be a 16×16 bit multiplier. That is, in a prior art multiplier apparatus, such as multiplier apparatus 11 of FIG. 4, the multiplier unit 14 comprises 16 columns of transistors, each column having 16 rows of transistors, with additional rows, or columns, or both to accommodate carries and other overhead operations involved in multiplication.

Figure 5:
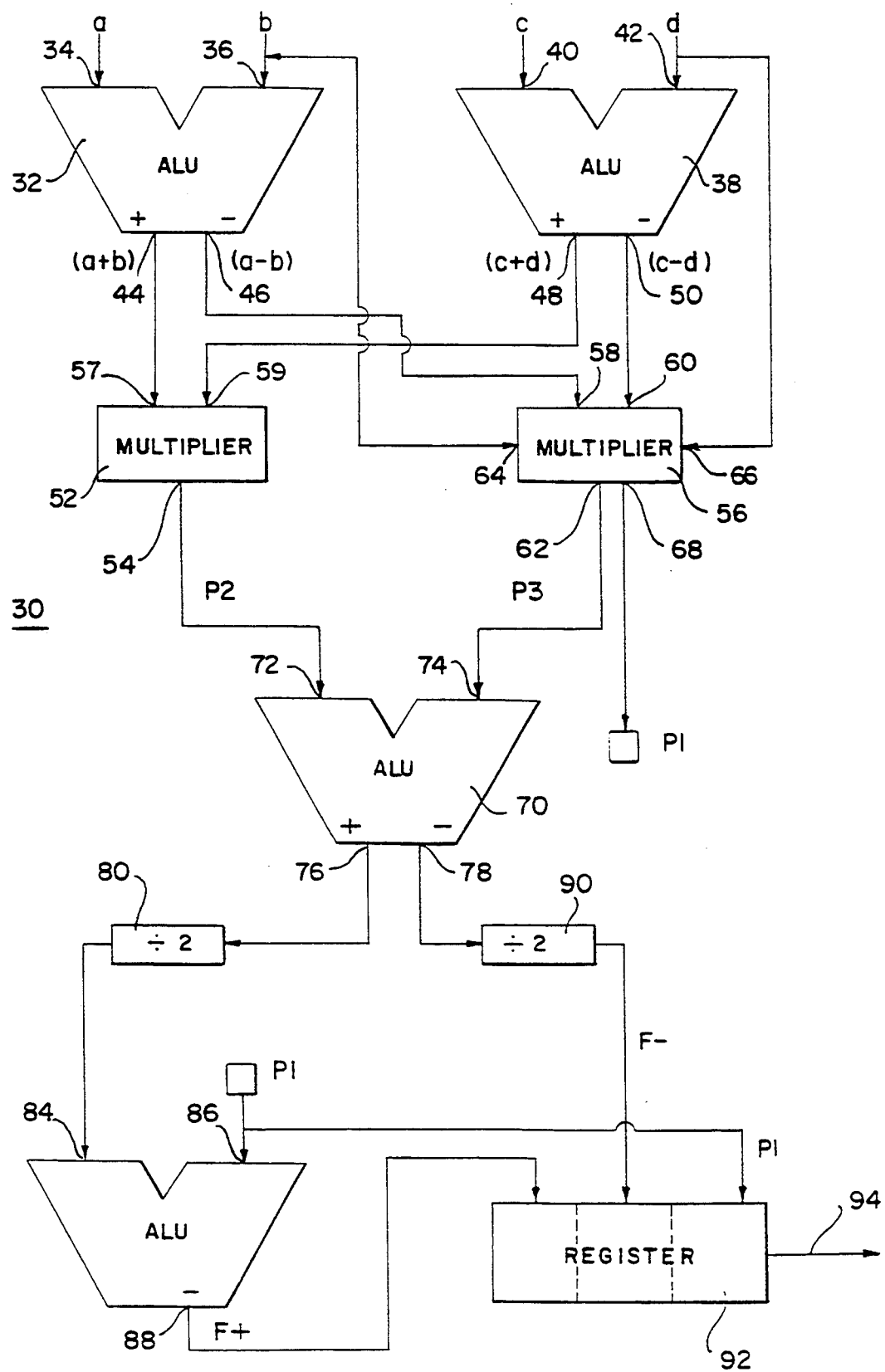
FIG. 5 is a schematic diagram of an apparatus for practicing the first embodiment of the method of the present invention in which the first number is segmented into a single first segment-pair and the second number is segmented into a single second segment-pair.

FIG. 5 is a schematic diagram of an apparatus for practicing the first embodiment of the method of the present invention in which the first number is segmented into a single first segment-pair and the second number is segmented into a single second segment-pair. Such segmentation was illustrated and discussed in connection with Examples I through IV. In FIG. 5, a multiplier apparatus 30 is illustrated comprising an arithmetic logic unit (ALU) 32 receiving higher significance segment "a" of the first segment-pair (a,b) at an input 34 and receiving lower significance segment "b" of the first segment-pair (a,b) at an input 36.

An ALU 38 receives the higher significance segment "c" of second segment-pair (c,d) at an input 40 and receives lower significance segment "d" of second segment-pair (c,d) at an input 42. ALU 32 has a summing output 44 at which is produced the sum (a+b), and a difference output 46 at which is produced the difference (a−b). ALU 38 has a summing output 48 at which is produced the sum (c+d), and a difference output 50 at which is produced the difference (c−d).

A multiplier 52 is connected to receive summing output 44 of ALU 32 at an input 57, and is connected to receive summing output 48 of ALU 38 at an input 59. Multiplier 52 produces a secondary partial product (P2=[a+b][c+d]) at an output 54. A multiplier 56 is connected to receive difference output 46 of ALU 32 at an input 58 is connected to receive difference output 50 of ALU 38 at an input 60. Multiplier 56 produces a tertiary partial product (P3=[a−b][c−d]) at an output 62. Multiplier 56 also receives the quantity "b" from input 36 of ALU 32 at an input 64, and receives the quantity "d" from input 42 of ALU 38 at an input 66. Multiplier produces a primary partial product P1 (P1=bd) at an output 68.

An ALU 70 receives secondary partial product P2 from output 54 of multiplier 52 at an input 72, and receives tertiary partial product P3 from output 62 of multiplier 56 at an input 74. ALU 70 has a summing output 76 and a difference output 78. The sum of secondary partial product P2 and tertiary partial product P3 is produced at summing output 76, is divided by two by a divider 80, and is passed to an ALU 82 at an input 84. ALU 84 also receives primary partial product P1 from output 68 of multiplier 56 at an input 86 and produces at a difference output 88 additive factor F+ (F+=[(P2+P3)÷2]−P1).

The output produced at difference output 78 of ALU 70 is divided by two by a divider 90 to produce subtractive factor F− (F−=[(P2−P3)÷2]). Additive factor F+, subtractive factor F−, and primary partial product P1 are appropriately provided to a register 92 according to the relationships described in connection with the first embodiment of the method of the present invention. Register 92 performs the shifting accumulation operation described in connection with the description of the first embodiment of the method of the present invention to generate the product of the numbers represented by first segment-pair (a,b) and second segment-pair (c,d) at an output 94.

Figure 6:
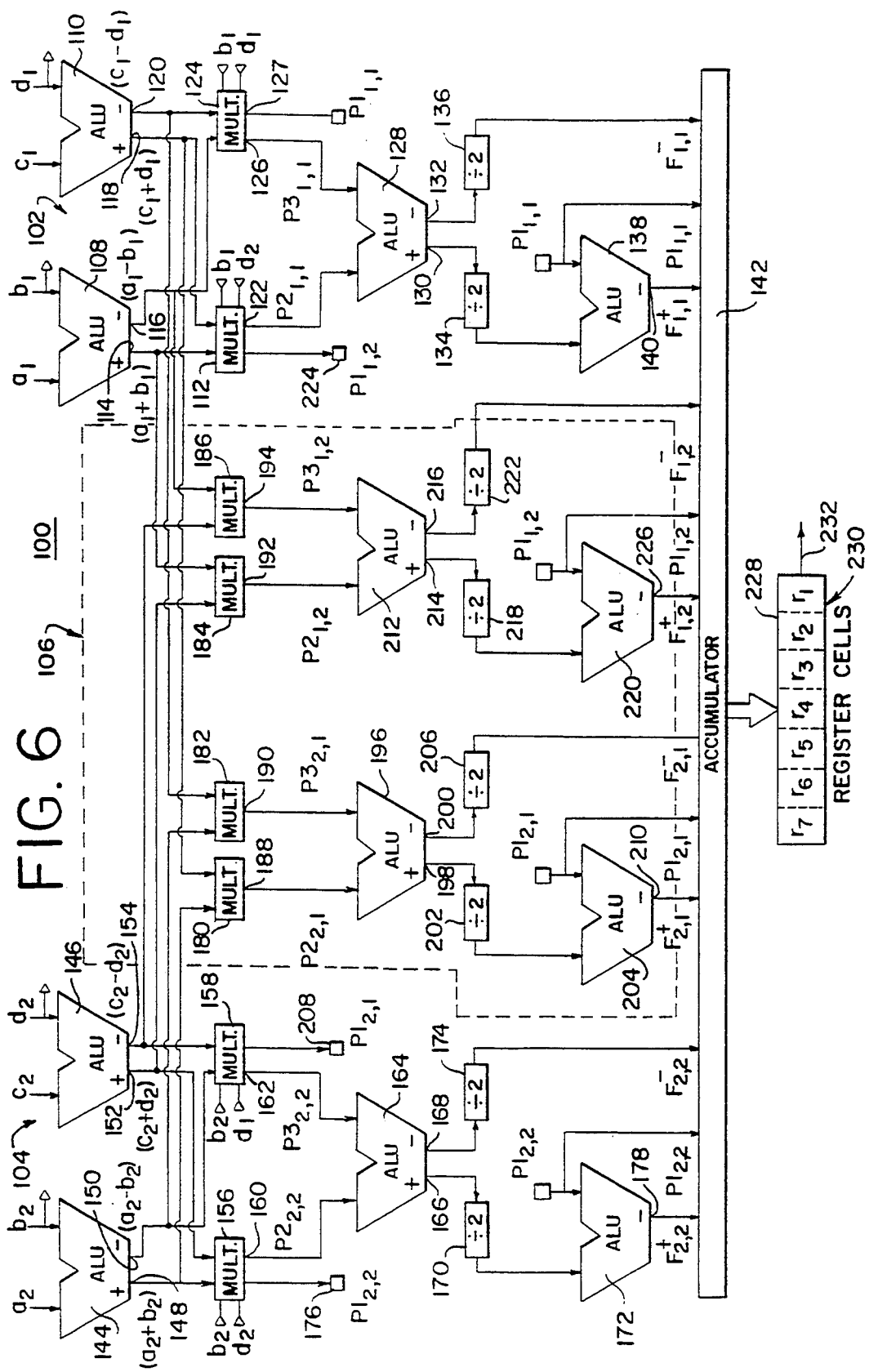
FIG. 6 is a schematic block diagram of an apparatus for practicing the first embodiment of the method of the present invention in which the multiplicand is segregated into first segment-pairs $(a_1,b_1)$ and $(a_2,b_2)$, and the multiplier is segregated into second segment-pairs $(c_1,d_1)$ and $(c_2,d_2)$.

FIG. 6 is a schematic block diagram of an apparatus for practicing the first embodiment of the method of the present invention in which the multiplicand is segregated into first segment-pairs $(a_1,b_1)$ and $(a_2,b_2)$, and the multiplier is segregated into second segment-pairs $(c_1,d_1)$ and $(c_2,d_2)$. In FIG. 6, a multiplier apparatus 100 is illustrated comprising a lower significance multiplier subsystem 102, a higher significance multiplier subsystem 104, and a cross-multiplying subsystem 106. Lower significance multiplier subsystem 102 and higher significance multiplier subsystem 104 are each substantially the same as multiplier apparatus 30, illustrated in FIG. 5.

Thus, lower significance multiplier subsystem 102 includes an ALU 108 receiving the higher-significance segment "$a_1$" and the lower-significance segment "$b_1$" of first segment-pair $(a_1,b_1)$ as inputs; and an ALU 110 receiving the higher-significance segment "$c_1$" and the lower-significance segment "$d_1$" of second segment-pair ($c_1,d_1$) as inputs.

A multiplier 112 receives inputs from summing output 114 of ALU 108 and summing output 118 of ALU 110 to provide secondary partial product $P2_{1,1}$ ($P2_{1,1}=[a_1+b_1][c_1+d_1]$) at an output 122. A multiplier 124 receives inputs from difference output 116 of ALU 108 and difference output 120 of ALU 110 to provide tertiary partial product $P3_{1,1}$ ($P3_{1,1}=[a_1-b_1][c_1-d_1]$) at an output 126.

An ALU 128 receives secondary partial product $P2_{1,1}$ from output 122 of multiplier 112 and tertiary partial product $P3_{1,1}$ from output 126 of multiplier 124 as inputs. The quantity ($P2_{1,1}+P3_{1,1}$) is provided at summing output 130 of ALU 128, is divided by two by a divider 134, and is provided as an input to an ALU 138. Quantity "$b_1$" and quantity "$d_1$" are provided to multiplier 124 so that multiplier 124 provides primary partial product $P1_{1,1}$ ($P1_{1,1}=b_1 d_1$) at an output 127. $P1_{1,1}$ is provided as an input to ALU 138 and is provided for accumulation in an accumulator 142. Difference output 140 of ALU 138 provides additive factor $F_{1,1}{}^+$ ($F_{1,1}{}^+=[(P2_{1,1}+P3_{1,1})\div 2]-P1_{1,1}$) for accumulation in accumulator 142. The quantity ($P2_{1,1}-P3_{1,1}$) is provided at difference output 132 of ALU 128 and is divided by two by a divider 136 to provide subtractive factor $F_{1,1}{}^-$ ($F_{1,1}{}^-=[P2_{1,1}-P3_{1,1}]\div 2$) for accumulation in accumulator 142.

Higher significance multiplier subsystem 104 includes an ALU 144 receiving higher-significance segment "$a_2$" and lower-significance segment "$b_2$" of first segment-pair ($a_2,b_2$) as inputs. An ALU 146 receives higher-significance segment "$c_2$" and lower-significance segment "$d_2$" of second segment-pair ($c_2,d_2$) as inputs. A multiplier 156 receives inputs from summing output 148 of ALU 144 and summing output 152 of ALU 14 6. A multiplier 158 receives inputs from difference output 150 of ALU 144 and difference output 154 of ALU 146. Multiplier 156 produces secondary partial product $P2_{2,2}$ ($P2_{2,2}=[a_2+b_2][c_2+d_2]$) at an output 160, and multiplier 158 produces tertiary partial product $P3_{2,2}$ ($P3_{2,2}=[a_2-b_2][c_2-d_2]$) at an output 162.

An ALU 16 4 receives secondary partial product $P2_{2,2}$ from output 160 of multiplier 156 and tertiary partial product $P3_{2,2}$ from output 162 of multiplier 158 as inputs. The quantity ($P2_{2,2}+P3_{2,2}$) is produced at summing output 166 of ALU 164, is divided by two by a divider 170, and is provided as an input to an ALU 172. The quantity ($P2_{2,2}-P3_{2,2}$) is produced at difference output 168 of ALU 164 and is divided by two by a divider 174 to provide subtractive factor $F_{2,2}{}^-$ ($F_{2,2}{}^-=[P2_{2,2}-P3_{2,2}]\div 2$) for accumulation in accumulator 142. Multiplier 156 receives quantity "$b_2$" and quantity "$d_2$" as inputs and produces primary partial product $P1_{2,2}$ ($P1_{2,2}=b_2 d_2$) at an output 176. Output 176 is operatively connected to provide primary partial product $P1_{2,2}$ as an input to ALU 172 and to provide $P1_{2,2}$ for accumulation in accumulator 142. Difference output 178 of ALU 172 provides additive factor $F_{2,2}{}^+$ ($F_{2,2}{}^+=[P2_{2,2}+P3_{2,2}]\div 2-P1_{2,2}$) for accumulation in accumulator 142.

Cross-multiplying subsystem 106 includes multipliers 180, 182, 184, and 186. Multiplier 180 receives as inputs the quantity ($a_2+b_2$) produced at summing output 148 of ALU 144 and the quantity ($c_1+d_1$) produced at summing output 118 of ALU 110, and produces secondary partial product $P2_{2,1}$ ($P2_{2,1}=[a_2+b_2][c_1+d_1]$) at an output 188. Multiplier 182 receives as inputs the quantity ($a_2-b_2$) produced at difference output 150 of ALU 144 and the quantity ($c_1-d_1$) produced at difference output 120 of ALU 110, and produces tertiary partial product $P3_{2,1}$ ($P3_{2,1}=[a_2-b_2][c_1-d_1]$) at an output 190. Multiplier 184 receives as inputs the quantity ($c_2+d_2$) produced at summing output 152 of ALU 146 and the quantity ($a_1+b_1$) produced at summing output 114 of ALU 108, and produces secondary partial product $P2_{1,2}$ ($P2_{1,2}=[a_1+b_1][c_2+d_2]$) at an output 192. Multiplier 186 receives as inputs the quantity ($c_2-d_1$) produced at difference output 154 of ALU 146 and the quantity ($a_1-b_1$) produced at difference output 116 of ALU 108, and produces tertiary partial product $P3_{1,2}$ ($P3_{1,2}=[a_1-b_1][c_2-d_2]$) at an output 194.

An ALU 196 receives secondary partial product $P2_{2,1}$ from output 188 of multiplier 180 and tertiary partial product $P3_{2,1}$ from output 190 of multiplier 182. The quantity ($P2_{2,1}+P3_{2,1}$) produced at summing output 198 of ALU 196 is divided by two by a divider 202 and provided as an input to an ALU 204. The quantity ($P2_{2,1}-P3_{2,1}$) produced at difference output 200 of ALU 196 is divided by two by a divider 206 to produce subtractive factor $F_{2,1}{}^-$ ($F_{2,1}{}^-=[P2_{2,1}-P3_{2,1}]\div 2$) for accumulation in accumulator 142.

Multiplier 158 receives as additional inputs the quantity "$b_2$" and the quantity "$d_1$" and produces primary partial product $P1_{2,1}$ ($P1_{2,1}=b_2 d_1$) at an output 208. Output 208 is operatively connected to provide primary partial product $P1_{2,1}$ as an input to ALU 204 and to provide $P1_{2,1}$ for accumulation in accumulator 142. ALU 204 provides at its difference output 210 additive factor $F_{2,1}{}^-$ ($F_{2,1}{}^+=[P2_{2,1}+P3_{2,1}]\div 2-P1_{1,1}$) for accumulation in accumulator 142.

An ALU 212 receives secondary partial product $P2_{1,2}$ ($P2_{2,1}=[a_1+b_1][c_2+d_2]$) from output 192 of multiplier 184 and receives tertiary partial product $P3_{1,2}$ ($P3_{1,2}=[a_1-b_1][c_2-d_2]$) from output 194 of multiplier 186 as inputs. ALU 212 provides at its summing output 214 a quantity ($P2_{1,2}+P3_{1,2}$) which is divided by two by a divider 218 and provided as an input to an ALU 220. ALU 212 also provides at its difference output 216 a quantity ($P2_{1,2}-P3_{1,2}$) which is divided by two by a divider 222 to produce subtractive factor $F_{1,2}{}^-$ ($F_{1,2}{}^-=[P2_{1,2}-P3_{1,2}]\div 2$) for accumulation in accumulator 142.

Multiplier 112 receives as inputs the quantities "$b_1$" and "$d_2$" and produces primary partial product $P1_{1,2}$ ($P1_{1,2}=b_1 d_2$) at an output 224. Output 224 is operatively connected to provide primary partial product $P1_{1,2}$ as an input to ALU 220 and to provide $P1_{1,2}$ for accumulation in accumulator 142. ALU 220 produces at its difference output 226 additive factor $F_{1,2}{}^+$ ($F_{1,2}{}^+=[P2_{1,2}+P3_{1,2}]\div 2-P1_{1,2}$) for accumulation in accumulator 142.

Accumulator 142 accumulates the various primary partial products $P1_{m,n}$, additive factors $F_{m,n}{}^+$, and subtractive factors $F_{m,n}{}^-$ for storage in an array of register cells 230 within a register 228. Register 228 performs a shifting accumulation operation as described in connection with the description of the first embodiment of the method of the present invention and the number residing within register 228 after completion of the shifting accumulation operation is the product of the first number comprising first segment-pairs ($a_1,b_1$) and ($a_2,b_2$) and the second number comprising second segment-pairs ($c_1,d_1$) and ($c_2,d_2$). That product is available for shifting, either serially or in parallel as appropriate, via an output 232.

FIG. 7 is a schematic block diagram of an apparatus for carrying out the preferred embodiment of the method of the present invention. In FIG. 7, a multiplying apparatus 240 receives a multiplicand from a multiplicand input 242 and receives a multiplier from a multiplier input 244. The multiplicand is received by a multiplexer 246 at an input 248 and the multiplier is received at an input 250 of multiplexer 246.

An array 252 of multipliers 254 is operatively connected by a bus 256 with multiplexer 246. Multiplexer 246 is programmed to recognize the significances of the respective digits of the multiplicand and the multiplier received at inputs 248, 250 so that, after routing respective pair-combinations of multiplicand digits and multiplier digits to available multipliers 254 for multiplication to produce a respective partial product for each such pair-combination, and after receiving the respective partial products from the array 252 of multipliers 254 via bus 256, multiplexer 246 directs accumulation of respective partial products in appropriate register cells 258 in result register 260 according to the significance of the multiplicand digit and the significance of the multiplier digit of the pair-combination involved in each respective partial product.

Result register 260 effects a shifting accumulation operation as described in connection with the preferred embodiment of the method of the present invention and, after completion of the shifting accumulation operation, the number residing in the array of register cells 258 is the product of the multiplicand and multiplier inputs received at inputs 248, 250 of multiplexer 246. That result is available for shifting through an output 262, either serially or in parallel as appropriate, for use or further processing by a system employing multiplying apparatus 240.

Figure 8:
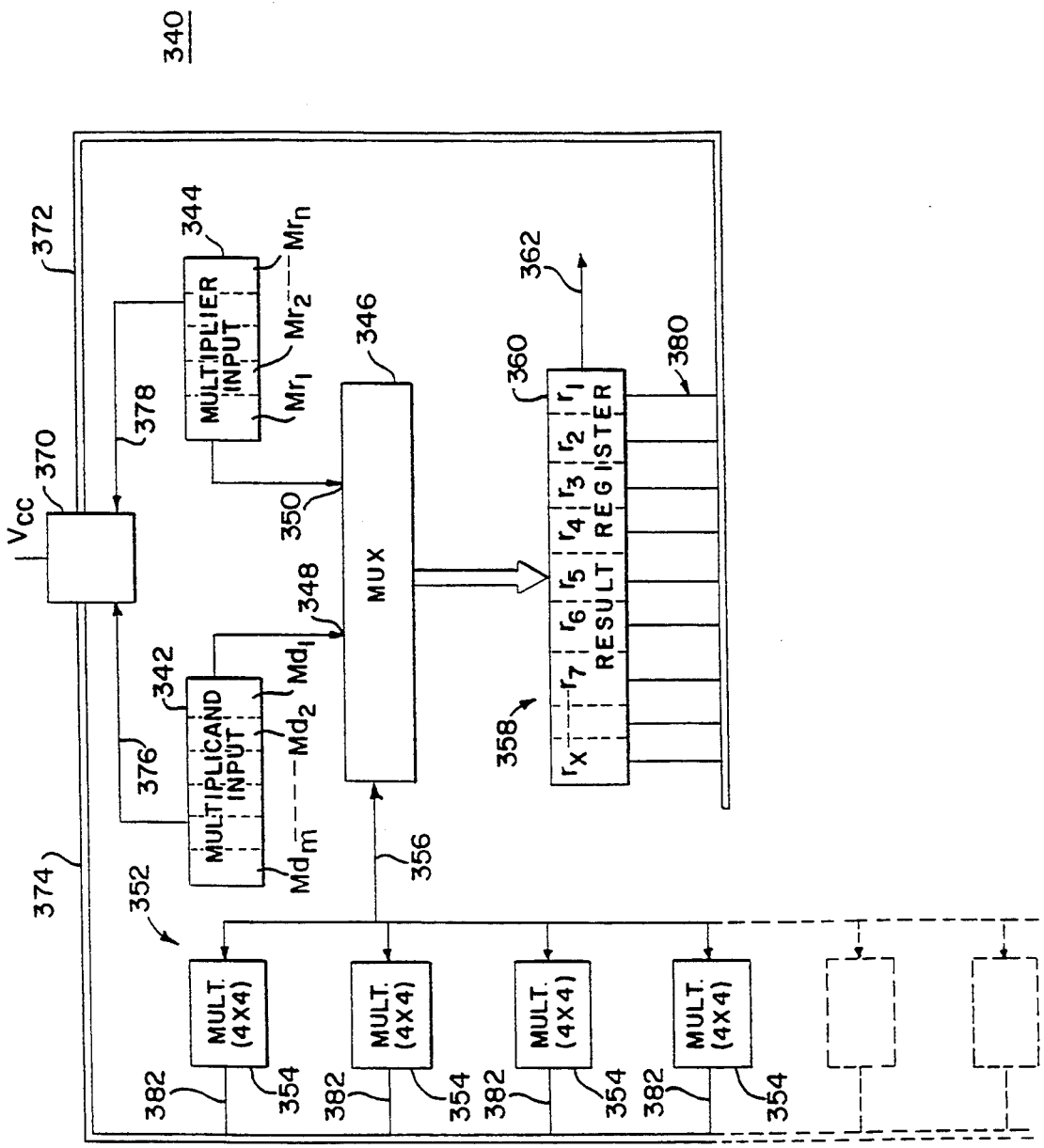
FIG. 8 is a schematic block diagram of an apparatus for providing power to selected portions of a multiplying device for carrying out the preferred embodiment of the method of the present invention.

FIG. 8 is a schematic block diagram of the preferred embodiment of an apparatus for providing power to selected portions of a multiplying device for carrying out the preferred embodiment of the method of the present invention.

For clarity of understanding, elements appearing in FIG. 8 which are similar to elements appearing in FIG. 7 are designated by similar reference numerals, increased by 100.

In FIG. 8, a multiplying apparatus 340 receives a multiplicand from a multiplicand input 342 and receives a multiplier from a multiplier input 344. Multiplicands $Md_1, Md_2, \ldots, Md_m$ may be queued in multiplicand input 342; multipliers $Mr_1, Mr_2, \ldots, Mr_n$ may be queued in multiplier input 344. The current multiplicand $Md_1$ to be used in a multiplication operation by multiplying apparatus 340 is received by multiplexer 346 at an input 348 and the current multiplier $Mr_1$ to be used in the multiplication operation with current multiplicand $Md_1$ is received at an input 350 of multiplexer 346.

An array 352 of multipliers 354 is operatively connected by a bus 356 with multiplexer 346. Multiplexer 346 is programmed to recognize the significance of the respective digits of the multiplicands $Md_m$ and the multipliers $Mr_n$ received at inputs 348, 350 so that, after routing respective pair-combinations of multiplicand digits and multiplier digits ($a_m$, $b_n$, see FIG. 3) to appropriate multipliers 354 for multiplication to produce a respective partial product for each such pair-combination ($a_m$, $b_n$). After receiving the respective partial products from array 352 of multipliers 354 via bus 356, multiplexer 346 directs accumulation of respective partial products in appropriate register cells 358 in result register 360 according to the significance of the multiplicand digit $a_m$ and the significance of the multiplier digit $b_n$ of the pair-combination involved in each respective partial product.

Result register 360 effects a shifting accumulation operation as described in connection with the preferred embodiment of the method of the present invention and, after completion of the shifting accumulation operation, the number residing in the array of register cells 358 is the product of the multiplicand $Md_m$ and multiplier $Mr_n$ received at inputs 348, 350 of multiplexer 346. That result is available for shifting through an output 362 either serially or in parallel as appropriate, for use or further processing by a system employing multiplying apparatus 340.

Multiplying apparatus 340 also includes a power control module 370 and power distribution buses 372, 374. Power control module 370 receives multiplicand inputs $Md_m$ via an input 376 and receives multiplier inputs $Mr_n$ via an input 378. Inputs 376, 378 may receive the current multiplicand $Md_1$ and the current multiplier $Mr_1$, or may receive an earlier (i.e., yet to be processed) multiplicand $Md_m$ and an earlier multiplier $Mr_n$, as indicated in FIG. 8.

The "powering up" of selected components of multiplying apparatus 340 in the contemplated preferred embodiment illustrated in FIG. 8 consists mainly in precharging field effect transistor (FET) switching devices. Such precharging may easily be accomplished in less than a clock cycle.

Power distribution bus 372 is operatively connected with result register 360 and, in particular, is operatively connected to selectively provide power to respective register cells $r_1, \ldots r_x$ via individual power lines 380. Power distribution bus 374 is operatively connected to selectively provide power to respective multipliers 354 via appropriate power lines 382.

Power control module 370 receives multiplicand inputs $Md_m$ and multiplier inputs $Mr_n$ and determines the sizes of a respective multiplicand input $Md_m$ and multiplier $Mr_n$ associated with a given multiplication operation. As discussed in connection with FIGS. 2 and 3, merely knowing the number of digits involved in a given multiplication operation enables determination of the number of register cells required to accommodate the preferred method of the present invention and, further, enables determination of the number of multipliers required for determining the respective partial products involved in practicing the preferred method of the present invention.

Power control module 370 may employ any appropriate means of a number of means for determining the sizes of multiplicands $Md_m$ and multipliers $Mr_n$. For example, the number of non-zero digits in a number may be counted, or the number of leading zeroes may be counted in a format comprising a predetermined number of digits.

Therefore, by way of example, power control module 370 may receive a multiplicand $Md_m$ comprising the digits $a_1$, $a_2$, $a_3$, 0 and may receive a multiplier $Mr_n$ comprising digits $b_1$, $b_2$, $b_3$, $b_4$. According to the algorithmic relationship illustrated in FIG. 2, the number of registers $r_x$ required to accommodate the preferred method of the present invention involving a 3-digit multiplicand and a 4-digit multiplier may be determined as $r_x = m + n - 1 = (3 + 4 - 1) = 6$. Thus, power control module 370 may determine that six result registers, $r_x$, must be powered up to accommodate the multiplication operation involving the particular multiplicand $Md_m$ and $Mr_n$ presently sampled. Similarly, power control module 370 may determine that a 3-digit multiplicand $Md_m$ (i.e., $a_1$, $a_2$, $a_3$, 0) and a 4-digit multiplier $Mr_n$ (i.e., $b_1$, $b_2$, $b_3$, $b_4$) would require 12 (i.e., 3×4) partial products to be calculated. Accordingly, power control module 370 may determine that 12 multipliers 354 need power in order to accomplish the particular multiplication operation involved. Of course, as mentioned in connection with FIGS. 2 and 3, a designer may contemplate multi-cycle partial product calculations so that, if fewer than 12 multipliers 354 are available, another algorithmic relation must be applied by power control module 370 to determine the number of cycles required and the consequent number of multipliers 354 to be precharged to effect the particular multiplication desired.

Of course, either power distribution bus 372 or power distribution bus 374 may be omitted so that power to multipliers 354 only or power to result registers $r_x$ only is controlled.

Figure 9:
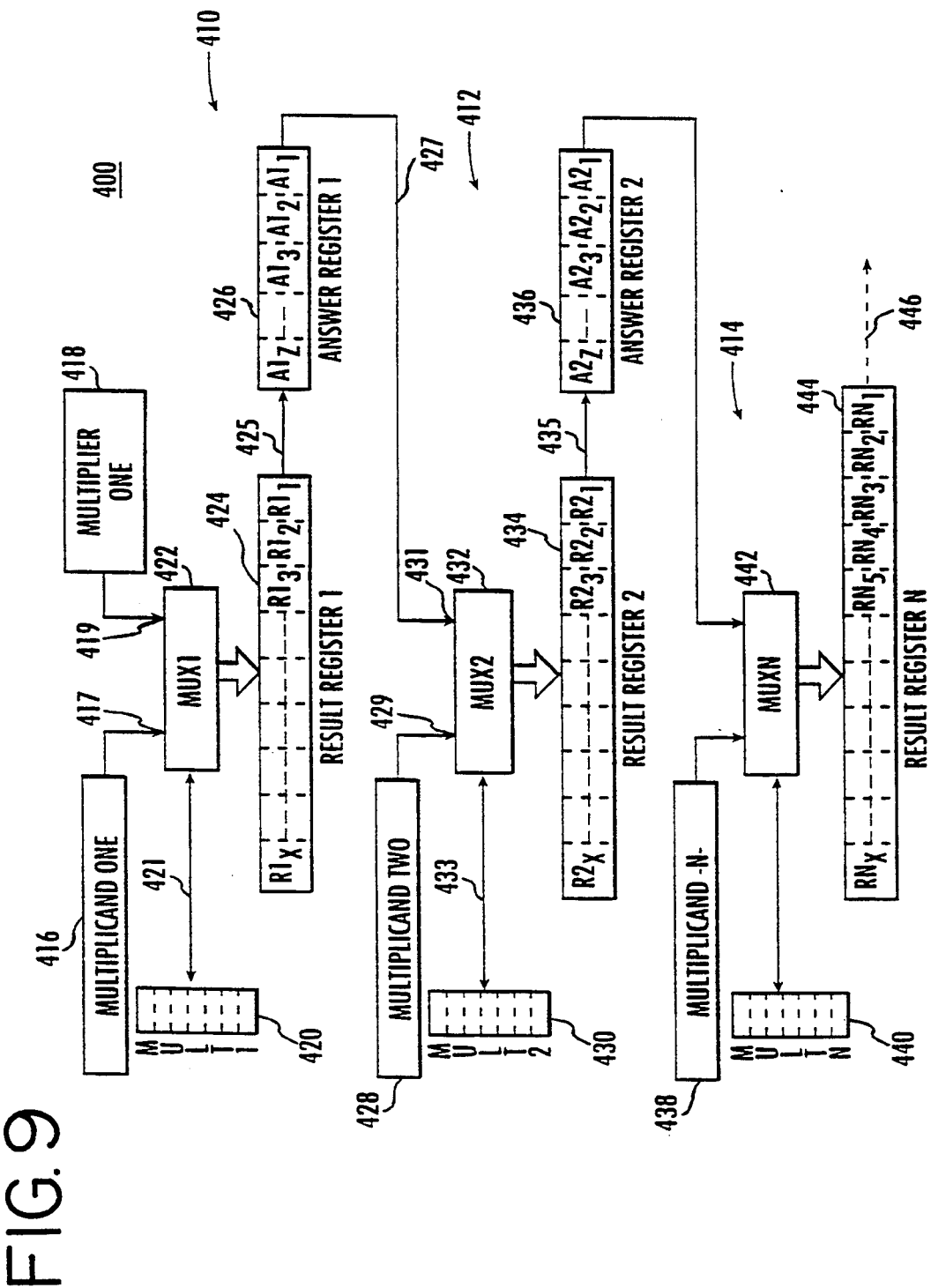
FIG. 9 is a schematic block diagram of one embodiment of the apparatus of the present invention.

FIG. 9 is a schematic block diagram of one embodiment of the apparatus of the present invention. In FIG. 9, an apparatus 400 for multiplying a plurality of numbers is illustrated, including a first iteration multiplier 410, a second iteration multiplier 412, and an nth iteration multiplier 414.

First iteration multiplier 410 includes a multiplicand input 416, a multiplier input 418, an array of multipliers 420 (arranged similarly to the matter of arrangement of multiplier array 352 of FIG. 8). Of course, a power control module such as power control module 370 of FIG. 8 could likewise be employed with the apparatus illustrated in FIG. 9 or FIG. 10. First iteration multiplier 410 further includes a multiplexer 422, a result register 424, and an answer register 426.

Second iteration multiplier 412 includes a multiplicand input 428, an array of multipliers 430 (also similar to multiplier array 352 of FIG. 8). A power control module such as power control module 370 could be employed with second iteration multiplier 412, or a master power control module could be employed to serve each of the multipliers 410, 412, 414 of apparatus 400. Second iteration multiplier 412 further includes a multiplexer 432, a result register 434, and an answer register 436.

The nth iteration multiplier 414 is so designated to indicate that any number of multipliers may be employed in apparatus 400 to accomplish multiplication of any plurality of numbers. The nth iteration multiplier 414 includes a multiplicand input 438, an array of multipliers 440 (similar to multiplier array 352 of FIG. 8), a multiplexer 442, and a result register 444.

In operation, apparatus 400 determines a product involving n numbers. Thus, first iteration multiplier 410 receives a multiplicand via multiplicand input 416 and receives a multiplier via multiplier input 418. Multiplicand input 416 supplies a first multiplicand to multiplexer 422 at an input 417 to multiplexer 422 and multiplier input 418 provides a first multiplier to multiplexer 422 at an input 419 to multiplexer 422. Multiplier array 420 is operatively connected by a bus 421 with multiplexer 422. Multiplexer 422 is programmed to recognize the significances of the respective digits of the multiplicand and the multiplier received, respectively, at inputs 417, 419 so that, after routing respective pair-combinations of multiplicand digits and multiplier digits to available to multipliers in multiplier array 420 for multiplication to produce a respective partial product for each such pair-combination, and after receiving the respective partial products from multiplier array 420 via bus 421, multiplexer 422 directs accumulation of respective partial products in appropriate register cells in result register 424 according to the significance of the multiplicand digit and the significance of the multiplier digit of the pair-combination involved in each respective partial product.

Result register 424 effects a shifting accumulation operation as described in connection with the method of the present invention and, after completion of the shifting accumulation operation, the number residing in result register 424 is the result product of the first multiplicand and the first multiplier received at inputs 417, 419 of multiplexer 422. This result product can be conveyed to answer register 426 via a bus 425.

Second iteration multiplier 412 continues an iterative processing of the plurality of numbers involved in the product to be determined by apparatus 400. That is, a second multiplicand is received from multiplicand input 428 by second multiplexer 432 at an input 429, and multiplexer 432 receives at an input 431 the result product from first iteration multiplier 410 via a bus 427. In the alternative, bus 425 from result register 424 can be directly connected with input 431 of multiplexer 432, negating any need for answer register 426. Multiplicand input 428 preferably provides a next respective number of the plurality of numbers to be involved in the product to be determined by apparatus 400 as a second multiplicand at input 429 of multiplexer 432.

Multiplexer 432 is programmed to recognize the significances of the respective digits of the multiplicand and multiplier (i.e., the result product from first iteration multiplier 410) received at inputs 429, 431 so that, after routing respective pair-combinations of multiplicand digits and multiplier digits to available multipliers in multiplier array 430 for multiplication to produce a respective partial product for each such pair-combination, and after receiving the respective partial products from multiplier array 430 via a bus 433, multiplexer 432 directs accumulation of respective partial products in appropriate registers in result register 434 according to the significance of the multiplicand digit and the significance of the multiplier digit of the pair-combination involved in each respective partial product.

Result register 434 effects a shifting accumulation operation as described in connection with the method of the present invention and, after completion of the shifting accumulation operation, the number residing in result register 434 is a result product of the multiplicand received at input 429 of multiplexer 432 and the result product received from first iteration multiplier 410 at input 431 of multiplexer 432. That is, the result product in result register 434 is the product of the multiplicand provided by multiplicand input 416, the multiplier provided by multiplier input 418, and the multiplicand provided by multiplicand input 428. That result product is available for shifting via a bus 435 to answer register 436.

By such iterative multiplication of succeeding result products from successive iteration multipliers 410, 412, 414, by next succeeding respective numbers of the plurality of numbers the final product is determined. The final product of the plurality of n numbers may be shifted out of result register 444 at an output 446.

Figure 10:
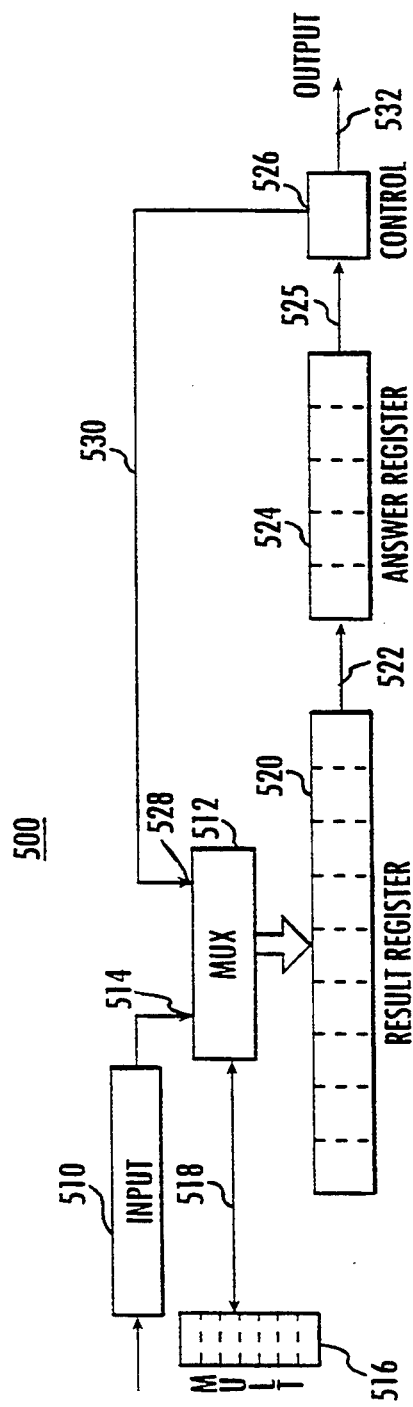
FIG. 10 is a schematic block diagram of the preferred embodiment of the apparatus of the present invention.

FIG. 10 is a schematic block diagram of the preferred embodiment of the apparatus of the present invention.

In FIG. 10, an apparatus 500 for determining the product of a plurality of numbers is illustrated. Apparatus 500 is comprised of an input device 510 by which succeeding numbers of the plurality of numbers involved in the desired product may be introduced to a multiplexer 512 at an input 514. Multiplexer 512 is programmed to recognize the significances of the respective digits of a first number and a second number introduced at input 514 from input 510. Thus, after writing respective pair-combinations of first digits and second digits to available multipliers in an array of multipliers 516 (similar to multiplier array 352 of FIG. 8) for multiplication to produce a respective partial product for each such pair-combination, and after receiving the respective partial products from multiplier array 516 via a bus 518, multiplexer 512 directs accumulation of respective partial products in appropriate register cells of a result register 520 according to the significance of the first digit and the significance of the second digit received at input 514 of the pair-combination involved in each respective partial product. Result register 520 effects a shifting accumulation operation as described in connection with the method of the present invention and, after completion of this shifting accumulation operation, the number residing in register 520 is the result product of the first number and second number received at input 514 of multiplexer 512.

That result product is available for shifting through an output bus 522, either serially or in parallel as appropriate, for use for further processing. That is, the result product conveyed via bus 522 may be conveyed to an answer register 524. Answer register 524 produces the result product on a bus 525. Operative connection of bus 525 is controlled via a control unit 526 to be established with an input 528 of multiplexer 512 via a bus 530 or to be established with an output bus 532.

Thus, apparatus 500 may be employed for iterative multiplication of a plurality of numbers by providing the result product in answer register 524 as a second multiplication factor (i.e, a multiplicand or a multiplier) to multiplexer 512 via input 528. In such manner, a third number (successively provided from the plurality of numbers for which the final product is desired) may be provided to input 514 from input device 510 for iterative processing with the result product from answer register 524. That is, the third number provided to input 514 is treated in the manner of a multiplicand and the result product provided to input 528 via bus 530 is treated in the manner of a multiplier for a second iterative multiplication performed by apparatus 500. Each succeeding remaining respective number of the plurality of numbers for which the final product is desired may be subsequently provided at input 514 of multiplexer 512 for processing in the manner of a multiplicand for multiplications with the next preceding iteration result product (treated as a multiplier) received via bus 530 at input 528 of multiplexer 512.

When all remaining respective numbers of the plurality of numbers for which the final product is desired have been iteratively multiplied by the preceding iteration result product, result register 520 will contain the final product of all respective numbers of the plurality of numbers for which the final product is desired. Of course, bus 522 may be directly connected with control block 526, or may be directly connected with bus 530 to effect the required iterative multiplication operation.

Inspection of FIGS. 9 and 10 illustrates the method of the present invention for determining the product of a plurality of numbers. An iterative multiplication process is effected, whereby a first two numbers (a multiplicand and a multiplier) may be accumulated in register cells according to the following previously described relationships:

Primary Partial Products: $P1 + hd_{m,n}$—[assigned to]→$r + hd2(m + n) - 3$

Subtractive Factors: $F + hd\ m,n^-$ —[assigned to]→$r + hd2(m + n) - 2$

Additive Factors: $F + hd\ m,n^+$ —[assigned to]→$r + hd2(m + n) - 1$

The shifting accumulation operation described in connection with the method in connection with the multiplication of two numbers is effected within the register in which the accumulation occurs and, after completion of the shifting accumulation operation, the register contains a result product of the first respective number of the plurality of numbers and the second respective number of the plurality of numbers. The method steps are repeated employing a next successive respective number of the plurality of numbers as one number of a multiplicand and a multiplier and employing the result product contained in the register as the result of the preceding iterative multiplication operation as the other number of the multiplicand and multiplier to generate a next iterative result product which in turn is employed with a next respective number of the plurality of numbers until all of the respective numbers of the plurality of numbers have been so iteratively multiplied with a next preceding iteration result product. The contents of the register after completion of the final shifting accumulation operation are the desired final product of the entire plurality of numbers involved. The same iterative method may be applied with whatever means is employed to accumulate partial products in the register cells among the various alternative methods described hereinabove.

Figure 11A:
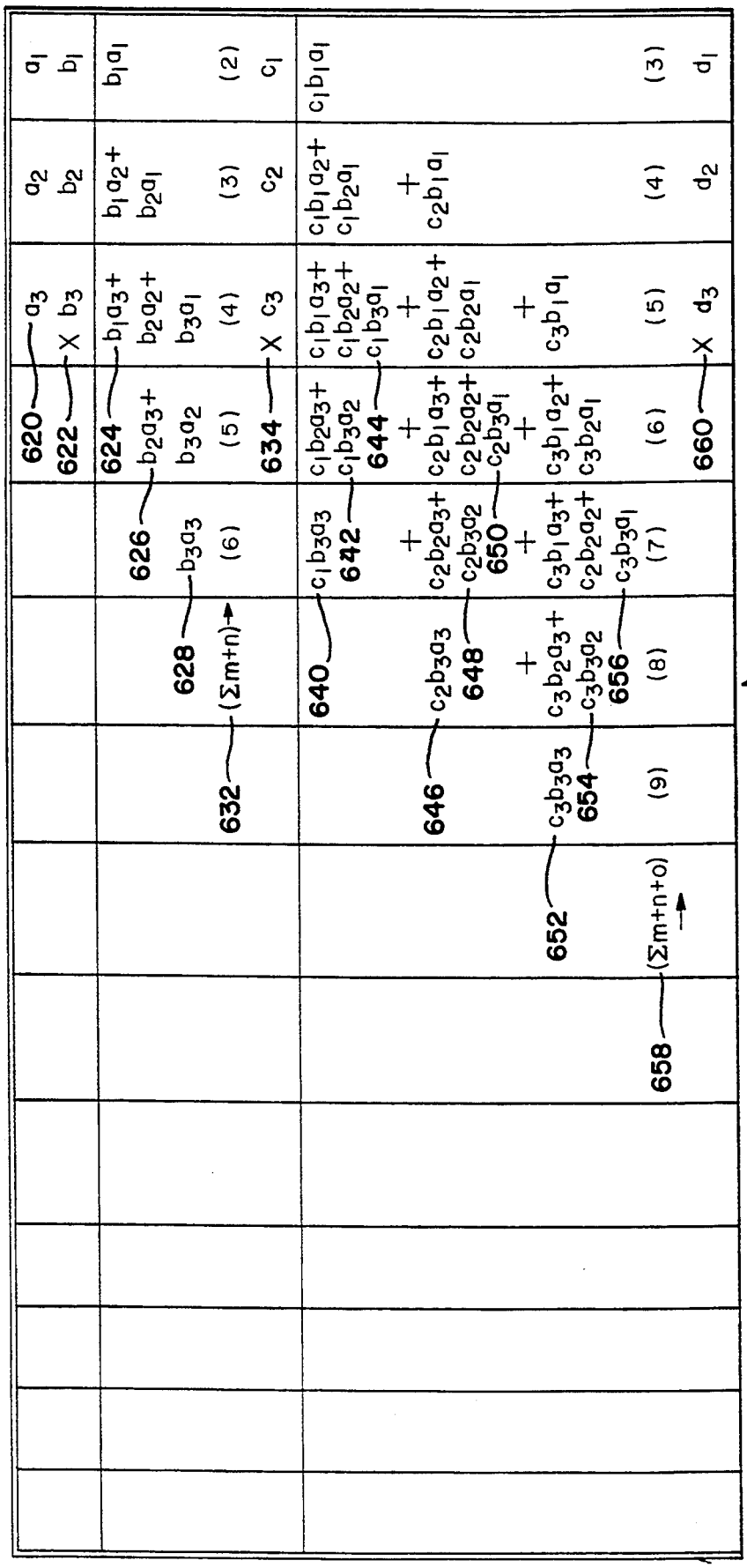
FIG. 11$a$ is the top portion and FIG. 11$b$ is the bottom portion of a skewed matrix representation of a multiplication of four numbers illustrating the register set-ups of the preferred embodiment of the present invention.

FIG. 11a is the top portion and FIG. 11b is the bottom portion of a skewed matrix representation of a multiplication of four numbers illustrating the register set-ups of the preferred embodiment of the present invention.

In FIGS. 11a and 11b, a matrix 600 is comprised of a plurality of rows 610 and a plurality of columns 612. A first member comprising three digits of increasing significance ($a_1$, $a_2$, $a_3$) at row 620 is multiplied by a second number comprising three digits of increasing significance ($b_1$, $b_2$, $b_3$) at row 622. The partial products for effecting the multiplication of ($a_1$, $a_2$, $a_3$) ($b_1$, $b_2$, $b_3$) are arranged according to generally accepted methods of manual multiplication in rows 624, 626, 628.

Registers $r_1$, $r_2$, $r_3$, ... are assigned as indicated at row 630 (FIG. 11b). The sum of the significances of the digits involved in each partial product arrayed in each respective column of matrix 600 is indicated at line 632 for the multiplication of ($a_1$, $a_2$, $a_3$) ($b_1$, $b_2$, $b_3$).

For the above-described multiplication of ($a_1$, $a_2$, $a_3$) ($b_1$, $b_2$, $b_3$), inspection of matrix 600 reveals that the relationship between the sum of the significances (i.e., the combinational significances) of the respective partial products in each respective column are related to the assigned register as follows:

$\Sigma m+n$ - - - [accumulates in] - - - $r\ [x]$;

Where:

$x = (m+n) - (N-1)$;

N=2; the number of numbers involved in the multiplication.

Continuing in FIGS. 11a, 11b, a third number comprising three digits of increasing significance ($c_1$, $c_2$, $c_3$) is indicated at line 634 (FIG. 11a), and the partial products for effecting the multiplication of ($a_1$, $a_2$, $a_3$)) ($b_1$, $b_2$, $b_3$) ($c_1$, $c_2$, $c_3$) are arranged according to generally accepted methods of manual multiplication in rows 640, 642, 644, 646, 648, 650, 652, 654, 656.

The sum of the significances of the digits involved in each partial product arrayed in each respective column of matrix 600 which is involved in the multiplication of ($a_1$, $a_2$, $a_3$) ($b_1$, $b_2$, $b_3$) ($c_1$, $c_2$, $c_3$) is indicated at line 658 (FIG. 11a). The relationship between the sum of the combinational significances involved in the multiplication and the respective register designations for the respective columns is as follows:

$$\Sigma_{m+n+o} \text{---[accumulates in]---} r[x];$$

Where $x=(m+n+o)-(N-1)$;
N=3; the number of numbers involved in the multiplication.

A fourth number comprising three digits of increasing significance ($d_1$, $d_2$, $d_3$) is indicated at line 660 (FIG. 11a). The partial products for effecting the multiplication of ($a_1$, $a_2$, $a_3$) ($b_1$, $b_2$, $b_3$) ($c_1$, $c_2$, $c_3$) ($d_1$, $d_2$, $d_3$) are arranged according to generally accepted methods of manual multiplication in rows 662, 664, 666, 668, 670, 672, 674, 676, 678, 680, 682, 684, 686, 688, 690, 692, 694, 696, 698, 700, 702.

The sum of the partial product combinational significances relates to the register designations for each respective column of matrix 600 as follows:

$$\Sigma_{m+n+o+p} \text{---[accumulates in]---} r[x].$$

Where $x=(m+n+o+p)-(N-1)$;
N=4; the number of numbers involved in the multiplication.

Thus, it may be seen that it is not necessary that iterative multiplication of a plurality of numbers be effected, as discussed in connection with FIG. 10 above, in order to accomplish the multiplication of a plurality of numbers. The relationship described above in connection with FIGS. 11a, 11b regarding the combinational significances and the designated registers for the various partial products of the N numbers involved in the multiplication holds true regardless of the number of numbers (N) involved in the multiplication, and regardless of the number of digits respectively contained in each of the N numbers.

Thus, the partial products accumulate in the respective register cells as follows:

$$P[m,n,o,p,\ldots]\text{---[accumulates in]---}r[x];$$

where:

$x=(m+n+o+p+\ldots)-(N-1)$;
$P[m,n,o,p,\ldots]$ represents a selected partial product;
m=significance of the digit from a first number of the N numbers involved in the selected partial product, m=1,2,3, ... ;
n=significance of the digit from a second number of the N numbers involved in the selected partial product, n=1,2,3, ... ;
o=significance of the digit from a third number of the N numbers involved in the selected partial product, o=1,2,3, ... ;
P, ... =significance of the digits from subsequent numbers involved in the selected partial product, p (and each subsequent significance)=1,2,3, ... ;
r[x]=the specified register cell having a significance "x".

The shifting accumulation operation described above in connection with the method regarding multiplication of two numbers is effected within the register to complete the multiplication of N numbers, once the accumulation of partial products within the register cells is complete. The contents of the register after completion of the shifting accumulation operation are the desired product of the entire plurality of N numbers.

Thus, no extra multiplying stages or iterative multiplications are required for multiplying a plurality of N numbers. All that is required is proper accumulation of partial products of digits of the N numbers in appropriate register cells according to the above-described relationship discussed in connection with FIGS. 11a, 11b, and completion of the shifting accumulation operation within the register.

It is to be understood that, while the detailed drawings and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

I claim:

1. A method for determining the product of a plurality of N numbers, each number of said N numbers having a plurality of digits hierarchically arranged from a least-significant digit to a most-significant digit, the method comprising the steps of:

(1) providing a logic means for determining a plurality of partial products;

(2) determining said plurality of partial products by said logic means, said plurality of partial products comprising a respective partial product for each combination of said plurality of digits of each of said N numbers, each of said partial products having a combinational significance, said combinational significance being established by said significance of each said digit of each of said N numbers of said combination involved in said respective partial product;

(3) providing an accumulator means for selectively accumulating accumulated values, said accumulated values being selected partial products of said plurality of partial products;

(4) providing a register means for storing information, said register means comprising a plurality of register cell means for storing said accumulated values, each of said plurality of register cell means having a hierarchical significance;

(5) accumulating said accumulated values in specific register cell means of said plurality of register cell means according to the following relationships:

$$P[m,n,o,p,\ldots]\text{---[accumulates in]}\rightarrow r[x];$$

where:

$x=(m+n+o+p+\ldots)-(N-1)$;

P[m,n,o,p, . . . ] represents said selected partial product;

m = significance of said digit from a first number of said N numbers involved in said selected partial product, m = 1,2,3, . . . ;

n = significance of said digit from a second number of said N numbers involved in said selected partial product, n = 1,2,3, . . . ;

o = significance of said digit from a third number of said N numbers involved in said selected partial product, o = 1,2,3, . . . ;

p, . . . = significance of said digits from subsequent numbers involved in said selected partial product, p (and each subsequent significance) = 1,2,3, . . . ;

r[x] = said specified register cell means having a significance "x";

(6) effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means; and (7) shifting the contents of said plurality of register cell means from said plurality of register cell means.

2. A method for determining the product of a plurality of N numbers, each number of said N numbers having a plurality of digits hierarchically arranged from a least-significant digit to a most-significant digit, the method comprising the steps of:

(1) determining a plurality of partial products, said plurality of partial products comprising a respective partial product for each combination of said plurality of digits of each of said N numbers, each of said partial products having a combinational significance, said combinational significance being established by said significance of each said digit of each of said N numbers of said combination involved in said respective partial product;

(2) providing an accumulator means for selectively accumulating accumulated values, said accumulated values being selected partial products of said plurality of partial products;

(3) providing a register means for storing information, said register means comprising a plurality of register cell means for storing said accumulated values, each of said plurality of register cell means having a hierarchical significance;

(4) accumulating said accumulated values in specific register cell means of said plurality of register cell means according to the following relationships:

P[m,n,o,p, . . . ]—[accumulates in]→r[x];

where:

$x = (m+n+o+p+ \ldots ) - (N-1)$;

P[m,n,o,p, . . . ] represents said selected partial product;

m = significance of said digit from a first number of said N numbers involved in said selected partial product, m = 1,2,3, . . . ;

n = significance of said digit from a second number of said N numbers involved in said selected partial product, n = 1,2,3, . . . ;

o = significance of said digit from a third number of said N numbers involved in said selected partial product, o = 1,2,3, . . . ;

p, . . . = significance of said digits from subsequent numbers involved in said selected partial product, p (and each subsequent significance) = 1,2,3, . . . ;

r[x] = said specified register cell means having a significance "x";

(5) effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means; and (6) shifting the contents of said plurality of register cell means from said plurality of register cell means.

3. A method for determining the product of a plurality of N numbers, each number of said N numbers having a plurality of digits hierarchically arranged from a least-significant digit to a most-significant digit, the method comprising the steps of:

(1) providing a logic means for determining a plurality of partial products;

(2) determining said plurality of partial products by said logic means, said plurality of partial products comprising a respective partial product for each combination of said plurality of digits of each of said N numbers, each of said partial products having a combinational significance, said combinational significance being established by said significance of each said digit of each of said N numbers of said combination involved in said respective partial product;

(3) providing a register means for storing information, said register means comprising a plurality of register cell means for storing said accumulated values, each of said plurality of register cell means having a hierarchical significance;

(4) accumulating selected partial products of said plurality of partial products in specific register cell means of said plurality of register cell means according to the following relationships:

P[m,n,o,p, . . . ] - - - [accumulates in] - - - r[x];

where:

x=(m+n+o+p+ . . . )−(N−1);

P[m,n,o,p, . . . ] represents said selected partial product;

m = significance of said digit a first number of said N numbers involved in said selected partial product, m=1,2,3, . . . ;

n = significance of said digit from a second number of said N numbers involved in said selected partial product, n=1,2,3, . . . ;

o = significance of said digit from a third number of said N numbers involved in said selected partial product, o=1,2,3, . . . ;

p, . . . = significance of said digits from subsequent numbers involved in said selected partial product, p (and each subsequent significance)=1,2,3, . . . ;

r[x]=said specified register cell means having a significance "x";

(5) effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means; and (6) shifting the contents of said plurality of register cell means from said plurality of register cell means.

4. A method for determining the product of a plurality of N numbers, each number of said N numbers having a plurality of digits hierarchically arranged from a least-significant digit to a most-significant digit, the method comprising the steps of:

(1) determining a plurality of partial products, said plurality of partial products comprising a respective partial product for each combination of said plurality of digits of each of said N numbers, each of said partial products having a combinational significance, said combinational significance being established by said significance of each said digit of each of said N numbers of said combination involved in said respective partial product;

(2) providing a register means for storing information, said register means comprising a plurality of register cell means for storing said accumulated values, each of said plurality of register cell means having a hierarchical significance;

(3) accumulating selected partial products of said plurality of partial products in specific register cell means of said plurality of register cell means according to the following relationships:

P[m,n,o,p, . . . ]—[accumulates in]→r[x];

where:

x=(m+n+o+p+ . . . )−(N−1);

P[m,n,o,p, . . . ] represents said selected partial product;

m = significance of said digit from a first number of said N numbers involved in said selected partial product, m=1,2,3, . . . ;

n = significance of said digit from a second number of said N numbers involved in said selected partial product, n=1,2,3, . . . ;

o = significance of said digit from a third number of said N numbers involved in said selected partial product, o=1,2,3, . . . ;

p, . . . = significance of said digits from subsequent numbers involved in said selected partial product, p (and each subsequent significance)=1,2,3, . . . ;

r[x]=said specified register cell means having a significance "x";

(4) effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means; and (5) shifting the contents of said plurality of register cell means from said plurality of register cell means.

5. An apparatus for determining the product of a plurality of N numbers, each number of said N numbers having a plurality of digits arranged from a least-significant digit to a most-significant digit; the apparatus comprising:

a logic means for determining a plurality of partial products; said plurality of partial products comprising a respective partial product for each combination of said plurality of digits of each of said N numbers, each of said partial products having a combinational significance, said combinational significance being established by said significance of each said digit of each of said N numbers of said combination involved in said respective partial product;

a register means coupled with said logic means for storing information; said register means comprising a plurality of register cell means for storing accumulated values, each of said plurality of register cell means having a hierarchical significance; and an accumulating means coupled with said logic means and with said register means for accumulating selected partial products of said plurality of partial products to produce accumulated values in specified register cells of said plurality of register cell means according to the following relationships:

P[m,n,o,p, . . . ]—[accumulates in]→r[x];

where:
x = (m+n+o+p+ . . . ) − (N−1);
P[m,n,o,p, . . . ] represents said selected partial product;
m = significance of said digit from a first number of said N numbers involved in said selected partial product, m = 1,2,3, . . . ;
n = significance of said digit from a second number of said N numbers involved in said selected partial product, n = 1,2,3, . . . ;
o = significance of said digit from a third number of said N numbers involved in said selected partial product, o = 1,2,3, . . . ;
p, . . . = significance of said digits from subsequent numbers involved in said selected partial product, p (and each subsequent significance) = 1,2,3, . . . ;
r[x] = said specified register cell means having a significance "x";
said register means effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means.

6. An apparatus for determining the product of a plurality of N numbers, each number of said N numbers having a plurality of digits arranged from a least-significant digit to a most-significant digit; the apparatus comprising:

a logic means for determining a plurality of partial products; said plurality of partial products comprising a respective partial product for each combination of said plurality of digits of each of said N numbers, each of said partial products having a combinational significance, said combinational significance being established by said significance of each said digit of each of said N numbers of said combination involved in said respective partial product; and a register means coupled with said logic means for storing information; said register means comprising a plurality of register cell means for storing accumulated values, each of said plurality of register cell means having a hierarchical significance;

said register means accumulating selected partial products of said plurality of partial products to produce accumulated values in specified register cells of said plurality of register cell means according to the following relationships:

P[m,n,o,p, . . . ]—[accumulates in]→r[x];

where:
x = (m+n+o+p+ . . . ) − (N−1);
P[m,n,o,p, . . . ] represents said selected partial product;
m = significance of said digit from a first number of said N numbers involved in said selected partial product, m = 1,2,3, . . . ;
n = significance of said digit from a second number of said N numbers involved in said selected partial product, n = 1,2,3, . . . ;
o = significance of said digit from a third number of said N numbers involved in said selected partial product, o = 1,2,3, . . . ;
p, . . . = significance of said digits from subsequent numbers involved in said selected partial product, p (and each subsequent significance) = 1,2,3, . . . ;
r[x] = said specified register cell means having a significance "x";
said register means effecting a shifting accumulation operation comprising shifting specific digits of said accumulated value stored in a lesser-significant register cell means of said plurality of register cell means to the next-higher-significant register cell means of said plurality of register cell means containing an accumulated value, and adding said specific digits to said accumulated value stored in said next-higher-significant register cell means as least-significant digits; said specific digits being those digits of said accumulated value stored in said lesser-significant register cell means having higher significance than the least-significant digit of said accumulated value; said shifting accumulation operation being effected sequentially between significance-adjacent register cell means of said plurality of register cell means from the least-significant register cell means to the most-significant register cell means within said register means.

7. An apparatus for determining the product of a plurality of N numbers, each number of said N numbers having a plurality of digits arranged from a least-significant digit to a most-significant digit; the apparatus comprising:

means for determining a plurality of partial products; said plurality of partial products comprising a respective partial product for each combination of said plurality of digits of each of said N numbers, each of said partial products having a combinational significance, said combinational significance being established by said significance of each said digit of each of said N numbers of said combination involved in said respective partial product;

a register coupled with said means for determining a plurality of partial products for storing information; said register comprising a plurality of register cells for storing accumulated values, each of said plurality of register cells having a hierarchical significance;

means coupled with said register and with said means for determining a plurality of partial products for accumulating selected partial products of said plurality of partial products to produce accumulated values in specified register cells of said plurality of register cells according to the following relationships:

P[m,n,o,p, . . . ]---[accumulates in]→r[x];

where:

x=(m+n+o+p+ . . . )−(N−1);

P[m,n,o,p, . . . ] represents said selected partial product;

m=significance of said digit from a first number of said N numbers involved in said selected partial product, m=1,2,3, . . . ;

n=significance of said digit from a second number of said N numbers involved in said selected partial product, n=1,2,3, . . . ;

o=significance of said digit from a third number of said N numbers involved in said selected partial product, o=1,2,3, . . . ;

p, . . . =significance of said digits from subsequent numbers involved in said selected partial product, p (and each subsequent significance)=1,2,3, . . . ;

r[x]=said specified register cell means having a significance "x"; and means coupled with said register for effecting a shifting accumulation operation comprising shifting specific digits of said accumulated value stored in a lesser-significant register cell of said plurality of register cells to the next-higher-significant register cell of said plurality of register cells containing an accumulated value, and adding said specific digits to said accumulated value stored in said next-higher-significant register cell as least-significant digits; said specific digits being those digits of said accumulated value stored in said lesser-significant register cell having higher significance than the least-significant digit of said accumulated value; said shifting accumulation operation being effected sequentially between significance-adjacent register cells of said plurality of register cells from the least-significant register cell to the most-significant register cell within said register.

* * * * *

UNITED STATES PATENT AND TRADEMARK OFFICE
CERTIFICATE OF CORRECTION

PATENT NO. : 5,452,242
DATED : September 19, 1995
INVENTOR(S) : Asghar, Safdar M.

It is certified that error appears in the above-indentified patent and that said Letters Patent is hereby corrected as shown below:

In claim 3, column 35, line 1, please replace "in]---r" with --in]⟶r--.

In claim 3, column 35, line 7, please insert --from-- after "digit".

Signed and Sealed this

Fourth Day of June, 1996

Attest:

BRUCE LEHMAN

*Attesting Officer*  *Commissioner of Patents and Trademarks*